US012626949B2

(12) United States Patent
    Suzuki et al.

(10) Patent No.: US 12,626,949 B2
(45) Date of Patent: May 12, 2026

(54) SOLID ELECTROLYTE, SOLID ELECTROLYTE LAYER AND SOLID ELECTROLYTE BATTERY

(71) Applicant: TDK CORPORATION, Tokyo (JP)

(72) Inventors: Hisashi Suzuki, Tokyo (JP); Tetsuya Ueno, Tokyo (JP)

(73) Assignee: TDK CORPORATION, Tokyo (JP)

( * ) Notice: Subject to any disclaimer, the term of this patent is extended or adjusted under 35 U.S.C. 154(b) by 806 days.

(21) Appl. No.: 17/628,098

(22) PCT Filed: Jul. 20, 2020

(86) PCT No.: PCT/JP2020/028153
    § 371 (c)(1),
    (2) Date: Jan. 18, 2022

(87) PCT Pub. No.: WO2021/024783
    PCT Pub. Date: Feb. 11, 2021

(65) Prior Publication Data
    US 2022/0255125 A1     Aug. 11, 2022

(30) Foreign Application Priority Data
    Aug. 7, 2019     (JP) ................................. 2019-145664

(51) Int. Cl.
    *H01M 10/0562*     (2010.01)
    *H01M 10/0525*     (2010.01)
    *H01B 1/06*     (2006.01)
(52) U.S. Cl.
    CPC ... *H01M 10/0562* (2013.01); *H01M 10/0525* (2013.01); *H01B 1/06* (2013.01); *H01M 2300/008* (2013.01); *Y02E 60/10* (2013.01)

(58) Field of Classification Search
    CPC ......... H01M 10/0525; H01M 10/0562; H01M 2300/008; Y02E 60/10; H01B 1/06
    See application file for complete search history.

(56) References Cited

U.S. PATENT DOCUMENTS

2020/0328463 A1* 10/2020 Sakai .................. H01M 10/052

FOREIGN PATENT DOCUMENTS

| EP | 3496202 A1 | 6/2019 |
|----|------------|--------|
| EP | 3736831 A1 | 11/2020 |
| EP | 3736833 A1 | 11/2020 |
| EP | 3745422 A1 | 12/2020 |
| JP | 2006-244734 A | 9/2006 |
| JP | 2013-257992 A | 12/2013 |
| WO | 2018/025582 A1 | 2/2018 |
| WO | 2019/135321 A1 | 7/2019 |
| WO | 2019/135348 A1 | 7/2019 |
| WO | 2019/146219 A1 | 8/2019 |

OTHER PUBLICATIONS

Sep. 24, 2020 International Search Report issued in International Patent Application No. PCT/JP2020/028153.

* cited by examiner

*Primary Examiner* — Lingwen R Zeng
(74) *Attorney, Agent, or Firm* — OLIFF PLC.

(57)     ABSTRACT

A solid electrolyte includes a compound composed of an alkali metal, at least one metal element selected from Zr, Hf, Ti, Sn, Mg, Ca, Sr, Cs, Ba, Y, Al, Sc, La, Ce, Pr, Nd, Pm, Sm, Eu, Gd, Tb, Dy, Ho, Er, Tm, Yb, Lu, Cu, Ag, Au, Pb, Bi, In, Sn, Sb, Nb, Ta and W and an element belonging to Group XVII of the periodic table.

8 Claims, 1 Drawing Sheet

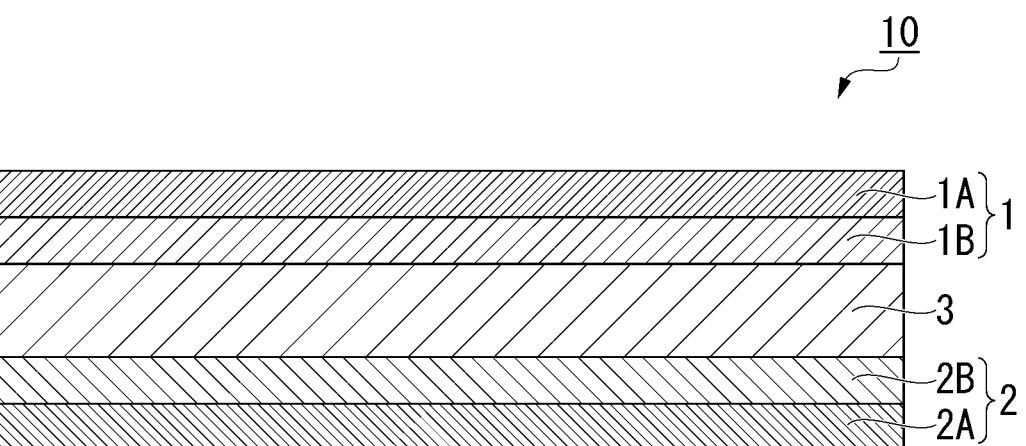

SOLID ELECTROLYTE, SOLID ELECTROLYTE LAYER AND SOLID ELECTROLYTE BATTERY

TECHNICAL FIELD

The present invention relates to a solid electrolyte, a solid electrolyte layer and a solid electrolyte battery.

The present application claims priority on Japanese Patent Application No. 2019-145664 filed in Japan on Aug. 7, 2019, the content of which is incorporated herein by reference.

BACKGROUND ART

In recent years, developments in electronics technology have been significant, and the size reduction, weight reduction, thickness reduction, and multi-functionalization of mobile electronic devices have been achieved. Accordingly, for batteries that serve as power sources of electronic devices, there is a strong demand for size reduction, weight reduction, thickness reduction, and reliability improvement. Therefore, solid electrolyte batteries in which a solid electrolyte is used as an electrolyte are gaining attention. As the solid electrolyte, oxide-based solid electrolytes, sulfide-based solid electrolytes, complex hydride-based solid electrolytes ($LiBH_4$ and the like) and the like are known.

Patent Document 1 discloses a solid electrolyte secondary battery having a positive electrode including a positive electrode layer containing a positive electrode active material containing a Li element and a positive electrode current collector, a negative electrode including a negative electrode layer containing a negative electrode active material and a negative electrode current collector and a solid electrolyte that is sandwiched between the positive electrode layer and the negative electrode layer and is composed of a compound represented by the following general formula.

$$Li_{3-2X}M_XIn_{1-Y}M'_YL_{6-Z}L'_Z$$

(In the formula, M and M' are metal elements and L and L' are halogen elements. In addition, X, Y and Z independently satisfy $0 \leq X \leq 1.5$, $0 \leq Y \leq 1$ and $0 \leq Z \leq 6$.)

Patent Document 2 discloses a solid electrolyte material represented by the following composition formula (1).

$$Li_{6-3Z}Y_ZX_6 \qquad \text{Formula (1)}$$

wherein $0 < Z < 2$ is satisfied, and X is Cl or Br.

In addition, Patent Document 2 describes a battery in which at least one of a negative electrode and a positive electrode contains the solid electrolyte material.

Patent Document 3 discloses a solid electrolyte battery including an electrode active material layer including an active material, a first solid electrolyte material that is in contact with the active material, has an anion component different from an anion component of the active material and is a single-phase electron-ion mixed conductor and a second solid electrolyte material that is in contact with the first solid electrolyte material, has the same anion component as the anion component in the first solid electrolyte material and is an ion conductor having no electron conductivity. In addition, Patent Document 3 discloses that the first solid electrolyte material is $Li_2ZrS_3$, the first solid electrolyte material has a peak of $Li_2ZrS_3$ at $2\theta=34.2°\pm0.5°$ in X-ray diffraction measurement using $CuK\alpha$ rays, and, in a case where the diffraction intensity of the peak of $Li_2ZrS_3$ at $2\theta=34.2°\pm0.5°$ is indicated by $I_A$ and the diffraction intensity of the peak of $ZrO_2$ at $2\theta=31.4°\pm0.5°$ is indicated by $I_B$, the value of $I_B/I_A$ is 0.1 or less.

PRIOR ART DOCUMENTS

Patent Document

Patent Document 1: Japanese Unexamined Patent Application, First Publication No. 2006-244734

Patent Document 2: PCT International Publication No. WO 2018/025582

Patent Document 3: Japanese Unexamined Patent Application, First Publication No. 2013-257992

DISCLOSURE OF INVENTION

Problems to be Solved by the Invention

However, in conventional solid electrolyte batteries, solid electrolytes that were used in solid electrolyte layers had insufficient ionic conductivity. Therefore, in conventional solid electrolyte batteries, it was not possible to obtain a sufficient discharge capacity.

The present invention has been made in consideration of the above-described problem, and an object of the present invention is to provide a solid electrolyte having a high ionic conductivity.

In addition, another object of the present invention is to provide a solid electrolyte layer including the above-described solid electrolyte and a solid electrolyte battery with a large discharge capacity including the solid electrolyte layer.

Solutions for Solving the Problems

The present inventors performed intensive studies in order to solve the above-described problem.

As a result, the present inventors found that a compound composed of an alkali metal, a specific metal element and an element belonging to Group XVII of the periodic table is preferably used as a solid electrolyte and obtained an idea of the present invention.

That is, the present invention relates to the following inventions.

[1] A solid electrolyte including a compound represented by the following formula (1).

$$A_{2+a}E_{1-b+a}G_bX_d \qquad (1)$$

(In the formula (1), A is one element selected from the group consisting of Li, K and Na. E is at least one element selected from the group consisting of Zr, Hf, Ti and Sn. G is at least one element selected from the group consisting of Mg, Ca, Sr, Cs, Ba, Y, Al, Sc, La, Ce, Pr, Nd, Pm, Sm, Eu, Gd, Tb, Dy, Ho, Er, Tm, Yb, Lu, Cu, Ag, Au, Pb, Bi, In, Sn, Sb, Nb, Ta and W. X is at least one selected from the group consisting of F, Cl, Br and I. a is −2b in a case where G is a hexavalent element, a is −b in a case where G is a pentavalent element, a is zero in a case where G is a tetravalent element or G is not contained, a is b in a case where G is a trivalent element, a is 2b in a case where G is a divalent element and a is 3b in a case where G is a monovalent element. $0 \leq b \leq 0.5$, $-0.3 \leq a \leq 0.3$ and $5.0 < d < 6.0$.)

[2] The solid electrolyte according to [1], in which, in the compound represented by the formula (1), $5.3 \leq d \leq 5.95$ is satisfied.

[3] The solid electrolyte according to [1] or [2], in which, in the compound represented by the formula (1), G is a monovalent element.

[4] The solid electrolyte according to [1] or [2], in which, in the compound represented by the formula (1), G is a divalent element.

[5] The solid electrolyte according to [1] or [2], in which, in the compound represented by the formula (1), G is a trivalent element.

[6] The solid electrolyte according to [1] or [2], in which, in the compound represented by the formula (1), G is a tetravalent element.

[7] The solid electrolyte according to [1] or [2], in which, in the compound represented by the formula (1), G is a pentavalent element.

[8] The solid electrolyte according to [1] or [2], in which, in the compound represented by the formula (1), G is a hexavalent element.

[9] The solid electrolyte according to any one of [1] to [8], in which, in the compound represented by the formula (1), X is F.

[10] The solid electrolyte according to any one of [1] to [8], in which, in the compound represented by the formula (1), X is Cl.

[11] The solid electrolyte according to any one of [1] to [8], in which, in the compound represented by the formula (1), X is Br.

[12] The solid electrolyte according to any one of [1] to [8], in which, in the compound represented by the formula (1), X is I.

[13] The solid electrolyte according to [1] or [2], in which, in the compound represented by the formula (1), A is Li, E is Zr, G is Y, and X is Cl.

[14] The solid electrolyte according to [1] or [2], in which the compound represented by the formula (1) is a compound represented by the following formula (2).

$$Li_2ZrCl_{d-e}I_e \qquad (2)$$

(In the formula (2), $5.3 \le d < 6.0$, $0 < d-e < 6.0$ and $0 < e < 6.0$.)

[15] The solid electrolyte according to any one of [1] to [14], further including 0.05 to 1.0 mass % of at least one compound selected from the group consisting of:

$A_2O$ (A is one element selected from the group consisting of Li, K and Na);

AX (A is one element selected from the group consisting of Li, K and Na. X is at least one selected from the group consisting of F, Cl, Br and I.);

$EO_2$ (E is at least one element selected from the group consisting of Zr, Hf, Ti and Sn);

$EX_4$ (E is at least one element selected from the group consisting of Zr, Hf, Ti and Sn. X is at least one selected from the group consisting of F, Cl, Br and I.); and $GO_n$ (G is at least one element selected from the group consisting of Mg, Ca, Sr, Cs, Ba, Y, Al, Sc, La, Ce, Pr, Nd, Pm, Sm, Eu, Gd, Tb, Dy, Ho, Er, Tm, Yb, Lu, Cu, Ag, Au, Pb, Bi, In, Sn, Sb, Nb, Ta and W. n is 0.5 in a case where G is a monovalent element, n is 1 in a case where G is a divalent element, n is 1.5 in a case where G is a trivalent element, n is 2 in a case where G is a tetravalent element, n is 2.5 in a case where G is a pentavalent element and n is 3 in a case where G is a hexavalent element.).

[16] A solid electrolyte layer including the solid electrolyte according to any one of [1] to [15].

[17] A solid electrolyte battery including a solid electrolyte layer, a positive electrode and a negative electrode, in which at least one of the solid electrolyte layer, the positive electrode and the negative electrode contains the solid electrolyte according to any one of [1] to [15].

[18] A solid electrolyte battery including a solid electrolyte layer, a positive electrode and a negative electrode, in which the solid electrolyte layer contains the solid electrolyte according to any one of [1] to [15].

Effects of Invention

According to the present invention, it is possible to provide a solid electrolyte having a high ionic conductivity. In addition, the solid electrolyte layer of the present invention contains the solid electrolyte of the present invention having a high ionic conductivity. Therefore, solid electrolyte batteries including the solid electrolyte layer of the present invention have a small internal resistance and a large discharge capacity.

BRIEF DESCRIPTION OF DRAWINGS

FIG. 1 is a schematic cross-sectional view of a solid electrolyte battery according to the present embodiment.

EMBODIMENTS FOR CARRYING OUT THE INVENTION

Hereinafter, a solid electrolyte, a solid electrolyte layer and a solid electrolyte battery of the present invention will be described in detail.

[Solid Electrolyte]

A solid electrolyte of the present embodiment is made of a compound composed of an alkali metal, at least one metal element selected from Zr, Hf, Ti, Sn, Mg, Ca, Sr, Ba, Y, Al, La, Ce, Pr, Nd, Pm, Sm, Eu, Gd, Tb, Dy, Ho, Er, Tm, Yb, Lu, Cu, Ag, Au, Pb, Bi, In, Sn, Sb, Nb, Ta and W and an element belonging to Group XVII of the periodic table.

The solid electrolyte of the present embodiment may be in a state of a powder (particles) including the compound or may be in a state of a sintered body obtained by sintering a powder including the compound. In addition, the solid electrolyte of the present embodiment may be in a state of a compact formed by compressing a powder, a compact obtained by forming a mixture of a powder and a binder or a coating film formed by coating a paint containing a powder, a binder and a solvent and then removing the solvent by heating.

The solid electrolyte of the present embodiment includes a compound represented by the following formula (1).

$$A_{2+a}E_{1-b+a}G_bX_d \qquad (1)$$

(In the formula (1), A is one element selected from the group consisting of Li, K and Na. E is at least one element selected from the group consisting of Zr, Hf, Ti and Sn. G is at least one element selected from the group consisting of Mg, Ca, Sr, Cs, Ba, Y, Al, Sc, La, Ce, Pr, Nd, Pm, Sm, Eu, Gd, Tb, Dy, Ho, Er, Tm, Yb, Lu, Cu, Ag, Au, Pb, Bi, In, Sn, Sb, Nb, Ta and W. X is at least one selected from the group consisting of F, Cl, Br and I. a is $-2b$ in a case where G is a hexavalent element, a is $-b$ in a case where G is a pentavalent element, a is zero in a case where G is a tetravalent element or G is not contained, a is b in a case where G is a trivalent element, a is 2b in a case where G is a divalent element and a is 3b in a case where G is a monovalent element. $0 \le b \le 0.5$, $-0.3 \le \alpha \le 0.3$ and $5.0 < d < 6.0$.)

In the compound represented by the formula (1), A is one element selected from the group consisting of Li, K and Na. A is preferably Li.

In the compound represented by the formula (1), a is $-2b$ in a case where G is a hexavalent element, a is $-b$ in a case where G is a pentavalent element, a is zero in a case where G is a tetravalent element or G is not contained, a is b in a case where G is a trivalent element, a is 2b in a case where G is a divalent element and a is 3b in a case where G is a monovalent element. In the compound represented by the formula (1), since a is the above-described numerical value that is determined depending on the valence of G, the amount of A becomes appropriate, and a solid electrolyte having a high ionic conductivity is obtained.

In the compound represented by the formula (1), E is at least one element selected from the group consisting of Zr, Hf, Ti and Sn. As E, Zr and/or Hf is preferably contained, and Zr is particularly preferable in order to obtain a solid electrolyte having a high ionic conductivity.

In the compound represented by the formula (1), G is at least one element selected from the group consisting of Mg, Ca, Sr, Cs, Ba, Y, Al, Sc, La, Ce, Pr, Nd, Pm, Sm, Eu, Gd, Tb, Dy, Ho, Er, Tm, Yb, Lu, Cu, Ag, Au, Pb, Bi, In, Sn, Sb, Nb, Ta and W.

In the compound represented by the formula (1), G may be, among the above-described elements, a monovalent element selected from Cs, Ag and Au.

In the compound represented by the formula (1), G may be, among the above-described elements, a divalent element selected from Mg, Ca, Ba, Cu, Sn, Pb and Sr.

In the compound represented by the formula (1), G may be, among the above-described elements, a trivalent element selected from Y, Al, Sc, La, Ce, Pr, Nd, Pm, Sm, Eu, Gd, Tb, Dy, Ho, Er, Tm, Yb, Lu, Bi, In and Sb. In a case where G is trivalent, G is preferably Y in order to obtain a solid electrolyte having a high ionic conductivity.

In the compound represented by the formula (1), G may be, among the above-described elements, Sn, which is a tetravalent element.

In the compound represented by the formula (1), G may be, among the above-described elements, a pentavalent element selected from Nb and Ta.

In the compound represented by the formula (1), G may be, among the above-described elements, W, which is a hexavalent element. In a case where G is hexavalent, G is preferably W in order to obtain a solid electrolyte having a high ionic conductivity.

In the compound represented by the formula (1), $0 \le b \le 0.5$ is satisfied, and G may not be contained. However, in order to obtain a solid electrolyte having a high ionic conductivity, G is preferably contained, and $0.02 \le b$ is more preferable. In a case where G is contained in the compound represented by the formula (1), b is made to satisfy $b \le 0.5$ in order not to excessively increase the amount of G and in order to obtain a solid electrolyte having a high ionic conductivity. In the compound represented by the formula (1), $b \le 0.3$ is preferable, and $b \le 0.2$ is more preferable.

In the compound represented by the formula (1), X is at least one selected from the group consisting of F, Cl, Br and I. As X, at least one selected from the group consisting of Cl, Br and I is preferable, B and/or I is preferably contained, and I is particularly preferably contained in order to obtain a solid electrolyte having a high ionic conductivity. In a case where F is contained as X, as X, F and two or more selected from the group consisting of Cl, Br and I are preferably contained in order to obtain a solid electrolyte having a high ionic conductivity.

In the compound represented by the formula (1), when X is F, a solid electrolyte having a sufficiently high ionic conductivity and excellent oxidation resistance is obtained, which is preferable.

In the compound represented by the formula (1), when X is Cl, a solid electrolyte having a high ionic conductivity and favorable balance between oxidation resistance and reduction resistance (resistance to reduction) is obtained, which is preferable.

In the compound represented by the formula (1), when X is Br, a solid electrolyte having a sufficiently high ionic conductivity and favorable balance between oxidation resistance and reduction resistance is obtained, which is preferable.

In the compound represented by the formula (1), when X is I, a solid electrolyte having a high ionic conductivity is obtained, which is preferable.

In the compound represented by the formula (1), X is an essential element, $5.0 < d < 6.0$ is satisfied, $5.3 \le d \le 5.95$ is preferable, and $5.4 \le d \le 5.9$ is more preferable. In the compound represented by the formula (1), since $d < 6.0$ is satisfied, it is assumed that a solid electrolyte having a high ionic conductivity is obtained for a reason to be described below.

In the compound where $d < 6.0$ is satisfied, it is assumed that a part of E becomes trivalent cations. In more detail, E is at least one element selected from the group consisting of Zr, Hf, Ti and Sn, and the valence of E is normally+4. However, in the compound represented by the formula (1), while the majority of E is tetravalent cations, a part of E is considered to be trivalent cations, and it is assumed that E is in a state where the tetravalent cations and the trivalent cations coexist. In addition, a part of E that is supposed to be tetravalent cations turns into trivalent cations, which decreases the positive charges of E. As a result, X disappears as much as a decrease in the positive charges of E, and $d < 6.0$ is satisfied. Therefore, in the compound represented by the formula (1), the positions of E that has disappeared turn into vacancies devoid of an atom, and it is assumed that the cations ($Li^+$, $K^+$ or $Li^+$) of A are easily movable and the ionic conductivity becomes high.

When $5.0 < d$ is satisfied, at least a part of E becomes tetravalent. As a result, in the compound represented by the formula (1), a structure where all of E is tetravalent cations is maintained. Therefore, trivalent cations and tetravalent cations coexist, the positions of E that has disappeared turn into vacancies devoid of an atom, and it is assumed that the cations ($Li^+$, $K^+$ or $Li^+$) of A are easily movable and the ionic conductivity becomes high.

In the compound represented by the formula (1), since the ratio of E to A is within an appropriate range, a solid electrolyte having a high ionic conductivity is obtained. Therefore, $-0.3 \le \alpha \le 0.3$ is satisfied, $-0.2 \le \alpha \le 0.2$ is preferable, and $-0.1 \le \alpha \le 0.1$ is more preferable.

In the compound represented by the formula (1), it is preferable that A is Li, E is Zr, G is Y, and X is Cl or Cl and I in order to obtain a solid electrolyte having a high ionic conductivity.

The compound represented by the formula (I) is preferably a compound represented by the following formula (2).

$$Li_2ZrCl_{d-e}I_e \qquad (2)$$

(In the formula (2), $5.3 \le d < 6.0$, $0 < d-e < 6.0$ and $0 < e < 6.0$.)

The compound represented by the following formula (2) is preferable in order to obtain a solid electrolyte having a high ionic conductivity.

The compound represented by the following formula (2) contains Cl and I as essential elements. In the compound represented by the following formula (2), d satisfies $5.3 \le d < 6.0$ and more preferably satisfies $5.4 \le d \le 5.9$. When d is 5.3 or more, according to the law of charge neutrality, 30% or more of Zr turns into tetravalent cations ($Zr^{4+}$), and the proportion of trivalent cations ($Zr^{3+}$) becomes less than 70% of Zr. Therefore, a part of Zr that is supposed to be $Zr^{4+}$ turns into $Zr^{3+}$. This decreases the positive charges of Zr. In addition, since 30% or more of Zr is $Zr^{4+}$, the compound represented by the formula (2) has a structure in which all of Zr is $Zr^{4+}$. As a result, $Cl^-$ and $I^-$ disappear as much as a decrease in the positive charges of Zr. In addition, the positions of $Cl^-$ and $I^-$ that have disappeared turn into vacancies devoid of an atom, and it is assumed that the cations ($Li^+$, $K^+$ or $Na^+$) of A are easily movable and the ionic conductivity becomes high.

In the compound represented by the following formula (2), since d<6.0 is satisfied, according to the law of charge neutrality, while the majority of Zr is $Zr^{4+}$, it is assumed that a part of Zr turns into $Zr^{3+}$ and a state where $Zr^{4+}$ and $Zr^{3+}$ coexist is formed. In addition, a part of Zr that is supposed to be $Zr^{4+}$ turns into $Zr^{3+}$, which decreases the positive charges of Zr. As a result, $Cl^-$ and $I^-$ disappear as much as a decrease in the positive charges of Zr, and d<6.0 is satisfied. Therefore, in the compound represented by the formula (2), the positions of $Cl^-$ and $I^-$ that have disappeared turn into vacancies devoid of an atom, and it is assumed that the cations ($Li^+$, $K^+$ or $Na^+$) of A are easily movable and the ionic conductivity becomes high.

The compound represented by the formula (2) contains I together with Cl. In the compound represented by the formula (2), since the number of I atoms is smaller than the number of Cl atoms, the ionic conductivity of the solid electrolyte becomes higher.

In the compound represented by the formula (1), the ratio of the ionic radius of X to the ionic radius of E per valence is preferably 7.0 to 15.0 and more preferably 8.0 to 13.0. The ionic radius of E per valence refers to a value obtained by dividing the ionic radius of E by the valence. When the ratio of the ionic radius of X to the ionic radius of E per valence is 7.0 or more, the ions of A in the formula (1) are easily movable, and a solid electrolyte having a high ionic conductivity can be obtained. When the ratio of the ionic radius of X to the ionic radius of E per valence is 15.0 or less, the heat stability improves, which is preferable.

The solid electrolyte of the present embodiment preferably contains, together with the above-described compound, 0.05 to 1.0 mass % of at least one compound selected from the group consisting of $A_2O$ (A is one element selected from the group consisting of Li, K and Na), AX (A is one element selected from the group consisting of Li, K and Na. X is at least one selected from the group consisting of F, Cl, Br and I.), $EO_2$ (E is at least one element selected from the group consisting of Zr, Hf, Ti and Sn), $EX_4$ (E is at least one element selected from the group consisting of Zr, Hf, Ti and Sn. X is at least one selected from the group consisting of F, Cl, Br and I.) and $GO_n$ (G is at least one element selected from the group consisting of Mg, Ca, Sr, Cs, Ba, Y, Al, Sc, La, Ce, Pr, Nd, Pm, Sm, Eu, Gd, Tb, Dy, Ho, Er, Tm, Yb, Lu, Cu, Ag, Au, Pb, Bi, In, Sn, Sb, Nb, Ta and W. n is 0.5 in a case where G is a monovalent element, n is 1 in a case where G is a divalent element, n is 1.5 in a case where G is a trivalent element, n is 2 in a case where G is a tetravalent element, n is 2.5 in a case where G is a pentavalent element and n is 3 in a case where G is a hexavalent element.).

The solid electrolyte containing, together with the above-described compound, 0.05 to 1.0 mass % of at least one compound selected from the group consisting of the $A_2O$, AX, $EO_2$, $EX_4$ and $GO_n$ has a higher ionic conductivity. The details of the reason therefor are not clear, but are considered as follows.

In such a solid electrolyte, the $A_2O$, AX, $EO_2$, $EX_4$ and $GO_n$ have a function of helping ionic connections between particles composed of the above-described compound. It is assumed that this decreases grain boundary resistance between the particles composed of the above-described compound and this makes it possible to obtain a high ionic conductivity throughout the entire solid electrolyte.

When the amount of the at least one compound selected from the group consisting of the $A_2O$, AX, $EO_2$, $EX_4$ and $GO_n$ that is contained in the solid electrolyte is 0.05% by mass or more and more preferably 0.1 mass % or more, the effect of decreasing the grain boundary resistance between the particles composed of the above-described compound due to the contained $A_2O$, AX, $EO_2$, $EX_4$ and $GO_n$ becomes significant. In addition, when the amount of the at least one compound selected from the group consisting of the $A_2O$, AX, $EO_2$, $EX_4$ and $GO_n$ is 1.0% by mass or less, there is no case where the amount of the $A_2O$, AX, $EO_2$, $EX_4$ and $GO_n$ becomes too large, which makes solid electrolyte layers containing the solid electrolyte hard and makes it difficult to form favorable interfaces helping the ionic connections between the particles composed of the above-described compound.

(Method for Manufacturing Solid Electrolyte)

In a case where the solid electrolyte of the present embodiment is in a powder state, the solid electrolyte can be produced by a method in which, for example, raw materials containing predetermined elements are mixed in a predetermined molar ratio and reacted.

In a case where the solid electrolyte of the present embodiment is a powder, the solid electrolyte can be produced by, for example, a mechanochemical method. In order to cause a mechanochemical reaction, for example, a planetary ball mill is used. The planetary ball mill is a device in which media (balls for accelerating crushing or the mechanochemical reaction) and a material are injected into a sealed container, rotated and revolved to impart kinetic energy to the material; and thereby crushing or the mechanochemical reaction is caused. Ordinarily, planetary ball mills do not accompany cooling apparatus or heating mechanisms. However, there is a case where the kinetic energy is converted into heat energy, whereby the sealed container (furthermore, the material in the sealed container) is heated. Therefore, some planetary ball mills accompany a cooling apparatus in order to prevent materials from being heated. In addition, some planetary ball mills have a heating mechanism that heats the sealed container (furthermore, the material in the sealed container) such that the mechanochemical reaction can be accelerated.

In the planetary ball mill, since the material is reacted in the sealed container, basically, there is no place for the injected material to escape (in a case where a gas is generated by the reaction, there is a possibility of the gas escaping to the outside of the sealed container). In addition, in a case where the material is reacted using the planetary ball mill, since the material is less likely to reach a high temperature in the middle of the reaction, phase separation is less likely to occur (this may not be true in a case where the material is heated). In contrast, for example, in a case where the material is reacted by a sintering process, there is a case where phase separation occurs when the material is chemically reacted at a high temperature and then returned to normal temperature and an intended compound cannot be obtained.

In the planetary ball mill, as the sealed container, for example, a zirconia container is used.

A raw material containing the raw materials at predetermined proportions and zirconia balls are injected into this sealed container. In a case where there is a concern that the raw materials may be hydrolyzed due to moisture, the raw material is handled in, for example, a glove box in which an argon gas is circulated, the dew point is −99° C. and the oxygen concentration is 1 ppm. The raw materials may be powders or may be liquids. For example, titanium chloride ($TiCl_4$) and tin chloride ($SnCl_4$) are liquid at normal temperature. After the raw materials are injected into the sealed container, the sealed container is sealed by closing a zirconia lid with a screw. After that, the planetary ball mill is operated for a predetermined time at a predetermined rotation speed and a predetermined revolution speed. With this method, the mechanochemical reaction is caused, and a powder-form solid electrolyte composed of a compound having a predetermined composition is obtained.

The powder-form solid electrolyte obtained as described above may be, for example, compressed using a hot press method to become a compact or may be put into a state of a sintered body sintered using a hot isostatic pressing (HIP) sintering technique.

In addition, the powder-form solid electrolyte may be put into a coating film state by mixing the powder-form solid electrolyte with a binder and a solvent to produce a paint, coating the paint on a film or the like, removing the solvent, and pressing the powder-form electrolyte as necessary.

In addition, in a case where the solid electrolyte of the present embodiment is in a state of a sintered body, the solid electrolyte can be produced by, for example, a method to be described below. First, predetermined raw materials are mixed at predetermined proportions. Next, the mixture of the raw materials is formed into a predetermined shape and sintered in a vacuum or in an inert gas atmosphere. A halide raw material that is contained in the raw materials is likely to evaporate when the temperature is raised. Therefore, a halogen may be supplemented by causing a halogen gas to coexist in the atmosphere at the time of sintering the mixture. In addition, the mixture may be sintered by a hot press method using a highly sealed mold. In this case, since the mold is highly sealed, it is possible to suppress the evaporation of the halide raw material by the sintering. When the mixture is sintered as described above, a solid electrolyte in a state of a sintered body composed of a compound having a predetermined composition is obtained.

The solid electrolyte of the present embodiment includes a compound composed of an alkali metal, the specific metal element described above and an element belonging to Group XVII of the periodic table. Therefore, the solid electrolyte of the present embodiment has a high ionic conductivity.

In addition, the compound in the solid electrolyte of the present embodiment is the compound represented by the formula (1) and thus has a high ionic conductivity. The details of the reason therefor are not clear, but are considered as follows.

In the compound represented by the formula (1), E is at least one element selected from the group consisting of Zr, Hf, Ti and Sn. The ionic radii of $Zr^{4+}$ (six-coordination), $Hf^{4+}$ (six-coordination), $Ti^{4+}$ (six-coordination) and $Sn^{4+}$ (six-coordination) are 0.72 Å, 0.71 Å, 0.605 Å and 0.690 Å, respectively. A value obtained by dividing the ionic radius of each element by the valence becomes, for example, $0.72 \div 4 = 0.18$ Å in the case of $Zr^{4+}$, 0.18 Å in the case of $Hf^{4+}$, 0.15 Å in the case of $Ti^{4+}$ and 0.17 Å in the case of $Sn^{4+}$. This value will be referred to as "the ionic radius per valence". In addition, in the compound represented by the formula (1), X is at least one selected from the group consisting of F, Cl, Br and I. The ionic radii of $F^-$, $Cl^-$, $Br^-$ and $I^-$, which serve as X, are 1.33 Å, 1.81 Å, 1.96 Å and 2.20 Å, respectively.

Therefore, for example, the ratio of the ionic radius of $Cl^-$ to the ionic radius of E per valence in the formula (1) becomes $1.81 \div 0.18 = 10.1$ in the case of $Cl^-$ and $Zr^{4+}$. Similarly, the ratio becomes 10.2 in the case of $Cl^-$ and $Hf^{4+}$, the ratio becomes 12.0 in the case of $Cl^-$ and $Ti^{4+}$, and the ratio becomes 10.5 in the case of $Cl^-$ and $Sn^{4+}$. As described above, the ratios of the ionic radius of $Cl^-$ to the ionic radius per valence of the tetravalent cations ($Zr^{4+}$, $Hf^{4+}$, $Ti^{4+}$ and $Sn^{4+}$) as E are sufficiently large.

Therefore, in the compound represented by the formula (1), a free space between $Cl^-$ and the tetravalent cation ($Zr^{4+}$, $Hf^{4+}$, $Ti^{4+}$ or $Sn^{4+}$) as E in the formula (1) is large, and it is easy for $Li^+$ to move (conduct electricity) in gaps between atoms in the compound. As a result, it is assumed that the compound represented by the formula (1) has a high ionic conductivity.

In contrast, for example, Patent Document 2 describes a solid electrolyte material represented by a composition formula $Li_{6-3Z}Y_ZX_6$ (wherein, $0 < Z < 2$ is satisfied, and X is Cl or Br.). The ionic radius (six-coordination) of $Y^{3+}$, which is a constituent element of the solid electrolyte material described in Patent Document 2, is 0.9 Å. Therefore, the ratio of the ionic radius of $Cl^-$ to the ionic radius per valence of $Y^{3+}$ becomes 6.0. This value is smaller than the ratio of the ionic radius of $Cl^-$ to the ionic radius per valence of the tetravalent cation ($Zr^{4+}$, $Hf^{4+}$, $Ti^{4+}$ or $Sn^{4+}$) as E.

It is assumed that this difference makes it easy for $Li^+$ to move and makes it possible to obtain a high ionic conductivity in the compound represented by the formula (1) compared with the solid electrolyte material described in Patent Document 2.

In addition, in the compound represented by the formula (1), since at least a part containing the element belonging to Group XVII of the periodic table is crystalline, a diffraction peak is confirmed at the time of carrying out X-ray diffraction measurement using $CuK\alpha$ rays. It is assumed that, in the compound represented by the formula (1) and in the solid electrolyte material described in Patent Document 2, the peak positions at 2θ in X-ray diffraction measurement using $CuK\alpha$ rays differ due to the above-described difference in the ionic radius ratio.

[Solid Electrolyte Battery]

FIG. 1 is a schematic cross-sectional view of a solid electrolyte battery according to the present embodiment.

The solid electrolyte battery 10 shown in FIG. 1 includes a positive electrode 1, a negative electrode 2 and a solid electrolyte layer 3.

The solid electrolyte layer 3 is sandwiched between the positive electrode 1 and the negative electrode 2. The solid electrolyte layer 3 contains the above-described solid electrolyte.

The positive electrode 1 and the negative electrode 2 are connected to external terminals (not shown) and are electrically connected to an external device.

The solid electrolyte battery 10 is charged or discharged by the transfer of ions between the positive electrode 1 and the negative electrode 2 through the solid electrolyte layer 3. The solid electrolyte battery 10 may be a laminate in which the positive electrode 1, the negative electrode 2 and the solid electrolyte layer 3 are laminated or may be a roll obtained by winding the laminate. The solid electrolyte battery is used in, for example, laminated batteries, rectangle batteries, cylindrical batteries, coin-like batteries, button-like batteries and the like.

(Positive Electrode and Negative Electrode)

As shown in FIG. 1, the positive electrode 1 includes, for example, a positive electrode current collector layer 1A and a positive electrode active material layer 1B containing a positive electrode active material. The negative electrode 2 includes, for example, a negative electrode current collector 2A and a negative electrode active material layer 2B containing a negative electrode active material.

(Positive Electrode)

As shown in FIG. 1, the positive electrode 1 includes the positive electrode mixture layer 1B provided on the sheet-shaped (foil-shaped) positive electrode current collector 1A.

(Positive Electrode Current Collector)

The positive electrode current collector 1A needs to be an electron conductive material that withstands oxidation during charging and does not easily corrode, and, for example, metals such as aluminum, stainless steel, nickel and titanium or conductive resins can be used. The positive electrode current collector 1A may have a powder form, a foil form, a punched form or an expanded form.

(Positive Electrode Mixture Layer)

The positive electrode mixture layer 1B contains a positive electrode active material and contains a solid electrolyte, a binder and a conductive auxiliary agent as necessary.

(Positive Electrode Active Material)

The positive electrode active material is not particularly limited as long as the positive electrode active material is capable of reversibly progressing the absorbing and desorbing of lithium ions and the intercalation and deintercalation of lithium ions, and it is possible to use positive electrode active materials that are used in well-known lithium ion secondary batteries. Examples of the positive electrode active material include lithium-containing metal oxides, lithium-containing metal-phosphorus oxides and the like.

Examples of the lithium-containing metal oxides include lithium cobalt oxide ($LiCoO_2$), lithium nickel oxide ($LiNiO_2$), lithium manganese spinel ($LiMn_2O_4$), composite metal oxides represented by a general formula: $LiNi_xCo_yMn_zO_2$ (x+y+z=1), lithium vanadium compounds ($LiVOPO_4$ and $Li_3V_2(PO_4)_3$), olivine-type $LiMPO_4$ (where M indicates at least one selected from Co, Ni, Mn, and Fe), lithium titanate ($Li_4Ti_5O_{12}$) and the like.

In addition, positive electrode active materials containing no lithium can also be used. Examples of such positive electrode active materials include metal oxides containing no lithium ($MnO_2$, $V_2O_5$ and the like), metal sulfides containing no lithium ($MoS_2$ and the like), fluorides containing no lithium ($FeF_3$, $VF_3$ and the like) and the like.

In the case of using such a positive electrode active material containing no lithium, lithium ions need to be doped into the negative electrode in advance or a negative electrode containing lithium ions needs to be used.

(Binder)

A binder is preferably contained in the positive electrode mixture layer 1B in order to bind the positive electrode active material, the solid electrolyte and the conductive auxiliary agent that configure the positive electrode mixture layer 1B and to adhere the positive electrode mixture layer 1B to the positive electrode current collector 1A. Examples of characteristics required for the binder include oxidation resistance, favorable adhesiveness and the like.

Examples of the binder that is used in the positive electrode mixture layer 1B include polyvinylidene fluoride (PVDF), copolymers thereof, polytetrafluoroethylene (PTFE), polyamide (PA), polyimide (PI), polyamide-imide (PAI), polybenzimidazole (PBI), polyether sulfone (PES), polyacrylic acids (PA), copolymers thereof, metal ion-cross-linked products of polyacrylic acids (PA) and the copolymers thereof, polypropylene (PP) in which maleic anhydride is grafted, polyethylene (PE) in which maleic anhydride is grafted, mixture thereof and the like. Among these, as the binder, PVDF is particularly preferably used.

The content rate of the solid electrolyte in the positive electrode mixture layer 1B is not particularly limited, but is preferably 1 vol % to 50 vol % and more preferably 5 vol % to 30 vol % based on the total mass of the positive electrode active material, the solid electrolyte, the conductive auxiliary agent and the binder.

The content rate of the binder in the positive electrode mixture layer 1B is not particularly limited, but is preferably 1 mass % to 15 mass % and more preferably 3 mass % to 5 mass % based on the total mass of the positive electrode active material, the solid electrolyte, the conductive auxiliary agent and the binder. When the amount of the binder is too small, there is a tendency that it becomes impossible to form the positive electrode 1 having a sufficient adhesive strength. In contrast, when the amount of the binder is too large, since ordinary binders are electrochemically inactive and thus do not contribute to discharge capacity, there is a tendency that it becomes difficult to obtain a sufficient volume or mass energy density.

(Conductive auxiliary agent)

The conductive auxiliary agent is not particularly limited as long as the conductive auxiliary agent improves the electron conductivity of the positive electrode mixture layer 1B, and well-known conductive auxiliary agents can be used. Examples thereof include carbon materials such as carbon black, graphite, carbon nanotubes and graphene, metals such as aluminum, copper, nickel, stainless steel, iron and amorphous metals, conductive oxides such as ITO and mixtures thereof.

The conductive auxiliary agent may have a powder form or a fiber form.

The content rate of the conductive auxiliary agent in the positive electrode mixture layer 1B is not particularly limited. In a case where the conductive auxiliary agent is added, normally, the content rate is preferably 0.5 mass % to 20 mass % and more preferably 1 mass % to 5 mass % based on the total mass of the positive electrode active material, the solid electrolyte, the conductive auxiliary agent and the binder.

(Negative Electrode)

As shown in FIG. 1, the negative electrode 2 includes the negative electrode mixture layer 2B provided on the negative electrode current collector 2A.

(Negative Electrode Current Collector)

The negative electrode current collector 2A needs to be conductive, and, for example, metals such as copper, aluminum, nickel, stainless steel and iron or conductive resin foils can be used. The negative electrode current collector 2A may have a powder form, a foil form, a punched form or an expanded form.

(Negative Electrode Mixture Layer)

The negative electrode mixture layer 2B contains a negative electrode active material and contains a solid electrolyte, a binder and a conductive auxiliary agent as necessary.

(Negative electrode active material)

The negative electrode active material is not particularly limited as long as the negative electrode active material is capable of reversibly progressing the absorbing and desorbing of lithium ions and the intercalation and deintercalation of lithium ions, and it is possible to use negative electrode active materials that are used in well-known lithium ion secondary batteries.

Examples of the negative electrode active material include carbon materials such as natural graphite, artificial graphite, mesocarbon microbeads, mesocarbon fibers (MCF), cokes, glassy carbon and sintered products of organic compounds, metals that can be combined with lithium such as Si, $SiO_x$, Sn and aluminum, alloys thereof, composite materials of the metal and the carbon material, oxides such as lithium titanate ($Li_4Ti_5O_{12}$) and $SnO_2$, metallic lithium and the like.
(Binder)

A binder is preferably contained in the negative electrode mixture layer 2B in order to bind the negative electrode active material, the solid electrolyte and the conductive auxiliary agent that configure the negative electrode mixture layer 2B and to adhere the negative electrode mixture layer 2B to the negative electrode current collector 2A. Examples of characteristics required for the binder include reduction resistance, favorable adhesiveness and the like.

Examples of the binder that is used in the negative electrode mixture layer 2B include polyvinylidene fluoride (PVDF), copolymers thereof, polytetrafluoroethylene (PTFE), polyamide (PA), polyimide (PI), polyamide-imide (PAI), polybenzimidazole (PBI), styrene butadiene rubber (SBR), carboxymethyl cellulose (CMC), polyacrylic acids (PA), copolymers thereof, metal ion-crosslinked products of polyacrylic acids (PA) and the copolymers thereof, polypropylene (PP) in which maleic anhydride is grafted, polyethylene (PE) in which maleic anhydride is grafted, mixture thereof and the like. Among these, as the binder, one or more selected from SBR, CMC and PVDF are preferably used.

The content rate of the solid electrolyte in the negative electrode mixture layer 2B is not particularly limited, but is preferably 1 vol % to 50 vol % and more preferably 5 vol % to 30 vol % based on the total mass of the negative electrode active material, the solid electrolyte, the conductive auxiliary agent and the binder.

The content rate of the binder in the negative electrode mixture layer 2B is not particularly limited, but is preferably 1 mass % to 15 mass % and more preferably 1.5 mass % to 10 mass % based on the total mass of the negative electrode active material, the conductive auxiliary agent and the binder. When the amount of the binder is too small, there is a tendency that it becomes impossible to form the negative electrode 2 having a sufficient adhesive strength. In contrast, when the amount of the binder is too large, since binders are, ordinarily, electrochemically inactive and thus do not contribute to discharge capacity, there is a tendency that it becomes difficult to obtain a sufficient volume or mass energy density.
(Conductive Auxiliary Agent)

As the conductive auxiliary agent that may be contained in the negative electrode mixture layer 2B, the same conductive auxiliary agent as the above-described conductive auxiliary agent that may be contained in the positive electrode mixture layer 1B such as carbon materials can be used.

The content rate of the conductive auxiliary agent in the negative electrode mixture layer 2B is not particularly limited. In a case where the conductive auxiliary agent is added, normally, the content rate is preferably 0.5 mass % to 20 mass % and more preferably 1 mass % to 12 mass % with respect to the negative electrode active material.
(Exterior Body)

In the solid electrolyte battery 10 of the present embodiment, a battery element composed of the positive electrode 1, the solid electrolyte layer 3 and the negative electrode 2 are accommodated and sealed in an exterior body. The exterior body needs to be an exterior body capable of suppressing the intrusion of moisture or the like into the inside from the outside and is not particularly limited.

For example, as the exterior body, it is possible to use an exterior body produced by forming a metal laminate film in a pouch shape. The metal laminate film is produced by coating both surfaces of a metal foil with polymer films. Such an exterior body is sealed by heat-sealing an opening part.

As the metal foil that forms the metal laminate film, for example, an aluminum foil, a stainless steel foil and the like can be used. As the polymer film that is disposed outside the exterior body, a polymer having a high melting point is preferably used, and, for example, polyethylene terephthalate (PET), polyamide and the like are preferably used. As the polymer film that is disposed inside the exterior body, for example, polyethylene (PE), polypropylene (PP) and the like are preferably used.
(External Terminals)

A positive electrode terminal is electrically connected to the positive electrode 1 in the battery element, and a negative electrode terminal is electrically connected to the negative electrode 2. In the present embodiment, the positive electrode terminal is electrically connected to the positive electrode current collector 1A, and the negative electrode terminal is electrically connected to the negative electrode current collector 2A. The connection portion between either of the positive electrode current collector or the negative electrode current collector and the external terminal (the positive electrode terminal or the negative electrode terminal) is disposed inside the exterior body.

As the external terminals, it is possible to use, for example, terminals formed of a conductive material such as aluminum or nickel.

A film composed of PE in which maleic anhydride is grafted (hereinafter, referred to as "acid-modified PE" in some cases) or PP in which maleic anhydride is grafted (hereinafter, referred to as "acid-modified PP" in some cases) is preferably disposed between the exterior body and the external terminal. Portions where a film composed of the acid-modified PE or acid-modified PP is disposed are heat-sealed, whereby the solid electrolyte battery becomes favorable in terms of the adhesion between the exterior body and the external terminals.
[Method for Manufacturing Solid Electrolyte Battery]

Next, a method for manufacturing the solid electrolyte battery according to the present embodiment will be described.

First, the above-described solid electrolyte that serves as the solid electrolyte layer 3 included in the solid electrolyte battery 10 of the present embodiment is prepared. In the present embodiment, as the material of the solid electrolyte layer 3, a solid electrolyte in a powder state is used. The solid electrolyte layer 3 can be produced using a powder forming method.

In addition, for example, a paste containing a positive electrode active material is coated on the positive electrode current collector 1A and dried to form the positive electrode mixture layer 1B; and thereby, the positive electrode 1 is manufactured. In addition, for example, a paste containing a negative electrode active material is coated on the negative electrode current collector 2A and dried to form the negative electrode mixture layer 2B; and thereby, the negative electrode 2 is manufactured.

Next, for example, a guide having a hole portion is installed on the positive electrode 1, and the solid electrolyte is loaded into the inside of the guide. After that, the surface of the solid electrolyte is levelled, and the negative electrode 2 is overlaid on the solid electrolyte. Thereby, the solid electrolyte is sandwiched between the positive electrode 1 and the negative electrode 2. After that, a pressure is applied to the positive electrode 1 and the negative electrode 2; and thereby, the solid electrolyte is subjected to pressure-forming. The solid electrolyte is pressure-formed; and thereby, a laminate is obtained in which the positive electrode 1, the solid electrolyte layer 3 and the negative electrode 2 are laminated in this order.

Next, external terminals are welded to the positive electrode current collector in the positive electrode 1 and the negative electrode current collector in the negative electrode 2, which form the laminate, by a well-known method, respectively; and thereby, the positive electrode current collector and the negative electrode current collector are electrically connected to the external terminals. After that, the laminate connected to the external terminals is accommodated in an exterior body, and the opening part of the exterior body is sealed by heat sealing.

The solid electrolyte battery 10 of the present embodiment is obtained by the above-described steps.

In the above-described method for manufacturing the solid electrolyte battery 10, a case where the solid electrolyte in a powder state is used has been described, but a solid electrolyte in a sintered body state may also be used.

In this case, the solid electrolyte battery 10 including the solid electrolyte layer 3 is obtained by a method in which the solid electrolyte in a sintered body state is sandwiched between the positive electrode 1 and the negative electrode 2 and is subjected to pressure-forming.

The solid electrolyte layer 3 of the present embodiment contains the solid electrolyte of the present embodiment having a high ionic conductivity.

Therefore, the solid electrolyte battery 10 of the present embodiment including the solid electrolyte layer 3 of the present embodiment have a small internal resistance and a large discharge capacity.

In the solid electrolyte battery of the present embodiment, the solid electrolyte may be loaded into vacancies in a battery element composed of the positive electrode, a separator and the negative electrode.

Such a solid electrolyte battery can be manufactured by, for example, a method to be described below. First, a solid electrolyte paint containing the solid electrolyte in a powder state and a solvent is produced. In addition, the battery element composed of the positive electrode, a separator and the negative electrode is produced. Furthermore, the battery element is impregnated with the solid electrolyte paint, and then the solvent is removed. Therefore, a solid electrolyte battery in which the solid electrolyte is loaded into vacancies in the battery element can be obtained.

Hitherto, the embodiment of the present invention has been described in detail with reference to the drawing. The respective configurations in the embodiment, a combination thereof, and the like are an example, and the addition, omission, substitution, and other modifications of the configuration are possible within the scope of the features of the present invention.

EXAMPLES

Example 1 to Example 88

In Example 1 to Example 88, halides of Zr, Hf, Ti and Sn $(ZrCl_4, ZrBr_4, ZrI_4, ZrF_4, HfCl_4, TiCl_4$ and $SnCl_4)$ prepared as raw materials were thermally treated at 100° C. for predetermined times, respectively, and the amounts of the halogens in the halides were controlled. Then, the halides were used.

Comparative Example 1 to Comparative Example 5

In Comparative Example 1 to Comparative Example 5, $ZrCl_4$ and $YCL_3$ prepared as raw materials were not thermally treated and were used as they were.

Example 1 to Example 88 and Comparative Example 1 to Comparative Example 5

Raw material powders containing predetermined raw materials in molar ratios shown in Table 1 to Table 4 were mixed and reacted for 24 hours using a planetary ball mill with the rotation speed set to 500 rpm, the revolving speed (orbital speed) set to 500 rpm and the rotation direction and the revolution direction set to opposite directions. Thereby, solid electrolytes in states of powders composed of compounds having compositions shown in Table 5 to Table 10 of Example 1 to Example 88 and Comparative Example 1 to Comparative Example 5 were manufactured.

The compositions of the respective solid electrolytes were obtained by a method in which the respective elements were analyzed using a high-frequency inductively coupled plasma (ICP) atomic emission spectrometer (manufactured by Shimadzu Corporation). For solid electrolytes containing fluorine, the amounts of fluorine that was contained in the solid electrolytes were analyzed using an ion chromatography device (manufactured by Thermo Fisher Scientific Inc.).

As a sealed container and balls for the planetary ball mill, a zirconia container and zirconia balls were used. Therefore, zirconium derived from the sealed container and the balls was incorporated into the manufactured compounds as contamination. It was known that the contamination amount of the zirconium derived from the sealed container and the balls was a certain constant amount. Table 5 to Table 10 show actual measurement values of the amounts of zirconium in the compounds.

Example 84 to Example 88

To the solid electrolyte $(Li_2ZrCl_{5.9})$ manufactured in Example 1, $Li_2O$, LiCl, $ZrO_2$, $ZrCl_4$ and CaO were added and mixed as additives, respectively, (0.1 mass % each); and thereby, solid electrolytes were manufactured.

Table 1 to Table 4 show raw materials used for the respective solid electrolytes, the blended proportions (molar ratio) of the raw materials, the ionic radii of "X" when the compositions of the respective solid electrolytes were applied to the formula (1) and the ratios of the ionic radius of "X" to the ionic radius per valence of "E", respectively.

In addition, in Table 5 to Table 10, for the compositions of the respective solid electrolytes, "O" is given in a case where the above-described formula (1) was satisfied, and "-" is given in a case where the above-described formula (1) was not satisfied. Furthermore, Table 5 to Table 10 show "A", "E", "G", "valence of G", "X", "a", "b", "α" and "d" when the compositions of the respective solid electrolytes were applied to the formula (1), respectively.

TABLE 1

| | Raw materials | | | Proportions of blended raw materials (molar ratio) | | | Ionic radius | Ratio of ionic radius of X to ionic radius per valence |
| | Material A | Material B | Material C | Material A | Material B | Material C | of X (Å) | of E |
|---|---|---|---|---|---|---|---|---|
| Example 1 | LiCl | $ZrCl_{3.9}$ | — | 2.0 | 1.0 | — | 1.81 | 10.1 |
| Example 2 | LiCl | $HfCl_{3.9}$ | — | 2.0 | 1.0 | — | 1.81 | 10.2 |
| Example 3 | LiCl | $TiCl_{3.9}$ | — | 2.0 | 1.0 | — | 1.81 | 12.0 |
| Example 4 | LiCl | $SnCl_{3.9}$ | — | 2.0 | 1.0 | — | 1.81 | 10.5 |
| Example 5 | LiCl | $ZrCl_{3.2}$ | CsCl | 2.3 | 0.9 | 0.1 | 1.81 | 10.1 |
| Example 6 | LiCl | $ZrCl_{3.3}$ | CsCl | 2.3 | 0.9 | 0.1 | 1.81 | 10.1 |
| Example 7 | LiCl | $ZrCl_{3.4}$ | CsCl | 2.3 | 0.9 | 0.1 | 1.81 | 10.1 |
| Example 8 | LiCl | $ZrCl_{3.6}$ | CsCl | 2.3 | 0.9 | 0.1 | 1.81 | 10.1 |
| Example 9 | LiCl | $ZrCl_{3.7}$ | CsCl | 2.3 | 0.9 | 0.1 | 1.81 | 10.1 |
| Example 10 | LiCl | $ZrCl_{3.8}$ | CsCl | 2.3 | 0.9 | 0.1 | 1.81 | 10.1 |
| Example 11 | LiCl | $ZrCl_{3.9}$ | CsCl | 2.3 | 0.9 | 0.1 | 1.81 | 10.1 |
| Example 12 | LiCl | $ZrCl_{3.9}$ | CsCl | 2.6 | 0.8 | 0.2 | 1.81 | 10.1 |
| Example 13 | LiCl | $ZrCl_{3.9}$ | CsCl | 2.9 | 0.7 | 0.3 | 1.81 | 10.1 |
| Example 14 | LiCl | $ZrCl_{3.9}$ | AgCl | 2.3 | 0.9 | 0.1 | 1.81 | 10.1 |
| Example 15 | LiCl | $ZrCl_{3.9}$ | AuCl | 2.3 | 0.9 | 0.1 | 1.81 | 10.1 |
| Example 16 | LiCl | $ZrC_{3.9}$ | $CuCl_2$ | 2.2 | 0.9 | 0.1 | 1.81 | 10.1 |
| Example 17 | LiCl | $ZrC_{3.9}$ | $PbCl_2$ | 2.2 | 0.9 | 0.1 | 1.81 | 10.1 |
| Example 18 | LiCl | $ZrC_{3.9}$ | $SnCl_2$ | 2.2 | 0.9 | 0.1 | 1.81 | 10.1 |
| Example 19 | LiCl | $ZrC_{3.9}$ | $MgCl_2$ | 2.2 | 0.9 | 0.1 | 1.81 | 10.1 |
| Example 20 | LiCl | $ZrCl_{3.9}$ | $CaCl_2$ | 2.2 | 0.9 | 0.1 | 1.81 | 10.1 |
| Example 21 | LiCl | $ZrCl_{3.9}$ | $SrCl_2$ | 2.2 | 0.9 | 0.1 | 1.81 | 10.1 |
| Example 22 | LiCl | $ZrCl_{3.2}$ | $BaCl_2$ | 2.2 | 0.9 | 0.1 | 1.81 | 10.1 |
| Example 23 | LiCl | $ZrCl_{3.3}$ | $BaCl_2$ | 2.2 | 0.9 | 0.1 | 1.81 | 10.1 |
| Example 24 | LiCl | $ZrCl_{3.4}$ | $BaCl_2$ | 2.2 | 0.9 | 0.1 | 1.81 | 10.1 |
| Example 25 | LiCl | $ZrCl_{3.6}$ | $BaCl_2$ | 2.2 | 0.9 | 0.1 | 1.81 | 10.1 |
| Example 26 | LiCl | $ZrCl_{3.7}$ | $BaCl_2$ | 2.2 | 0.9 | 0.1 | 1.81 | 10.1 |
| Example 27 | LiCl | $ZrCl_{3.8}$ | $BaCl_2$ | 2.2 | 0.9 | 0.1 | 1.81 | 10.1 |
| Example 28 | LiCl | $ZrCl_{3.9}$ | $BaCl_2$ | 2.2 | 0.9 | 0.1 | 1.81 | 10.1 |
| Example 29 | LiCl | $ZrCl_{3.9}$ | $BiCl_3$ | 2.1 | 0.9 | 0.1 | 1.81 | 10.1 |

TABLE 2

| | Raw materials | | | Proportions of blended raw materials (molar ratio) | | | Ionic radius | Ratio of ionic radius of X to ionic radius per valence |
| | Material A | Material B | Material C | Material A | Material B | Material C | of X (Å) | of E |
|---|---|---|---|---|---|---|---|---|
| Example 30 | LiCl | $ZrCl_{3.9}$ | $InCl_3$ | 2.1 | 0.9 | 0.1 | 1.81 | 10.1 |
| Example 31 | LiCl | $ZrCl_{3.9}$ | $SbCl_3$ | 2.1 | 0.9 | 0.1 | 1.81 | 10.1 |
| Example 32 | LiCl | $ZrCl_{3.9}$ | $YCl_3$ | 2.1 | 0.9 | 0.1 | 1.81 | 10.1 |
| Example 33 | LiCl | $ZrCl_{3.9}$ | $YCl_3$ | 2.2 | 0.8 | 0.2 | 1.81 | 10.1 |
| Example 34 | LiCl | $ZrCl_{3.9}$ | $YCl_3$ | 2.3 | 0.7 | 0.3 | 1.81 | 10.1 |
| Example 35 | LiCl | $ZrCl_{3.9}$ | $YCl_3$ | 2.4 | 0.6 | 0.4 | 1.81 | 10.1 |
| Example 36 | LiCl | $ZrCl_{3.9}$ | $YCl_3$ | 2.5 | 0.5 | 0.5 | 1.81 | 10.1 |
| Example 37 | LiCl | $ZrCl_{3.9}$ | $ScCl_3$ | 2.1 | 0.9 | 0.1 | 1.81 | 10.1 |
| Example 38 | LiCl | $ZrCl_{3.9}$ | $AlCl_3$ | 2.1 | 0.9 | 0.1 | 1.81 | 10.1 |
| Example 39 | LiCl | $ZrCl_{3.9}$ | $LaCl_3$ | 2.1 | 0.9 | 0.1 | 1.81 | 10.1 |
| Example 40 | LiCl | $ZrCl_{3.9}$ | $CeCl_3$ | 2.1 | 0.9 | 0.1 | 1.81 | 10.1 |
| Example 41 | LiCl | $ZrCl_{3.9}$ | $PrCl_3$ | 2.1 | 0.9 | 0.1 | 1.81 | 10.1 |
| Example 42 | LiCl | $ZrCl_{3.9}$ | $NdCl_3$ | 2.1 | 0.9 | 0.1 | 1.81 | 10.1 |
| Example 43 | LiCl | $ZrCl_{3.9}$ | $PmCl_3$ | 2.1 | 0.9 | 0.1 | 1.81 | 10.1 |
| Example 44 | LiCl | $ZrCl_{3.9}$ | $SmCl_3$ | 2.1 | 0.9 | 0.1 | 1.81 | 10.1 |

TABLE 3

| | Raw materials | | | Proportions of blended raw materials (molar ratio) | | | Ionic radius | Ratio of ionic radius of X to ionic radius per valence |
| | Material A | Material B | Material C | Material A | Material B | Material C | of X (Å) | of E |
|---|---|---|---|---|---|---|---|---|
| Example 45 | LiCl | $ZrCl_{3.9}$ | $EuCl_3$ | 2.1 | 0.9 | 0.1 | 1.81 | 10.1 |
| Example 46 | LiCl | $ZrCl_{3.9}$ | $GdCl_3$ | 2.1 | 0.9 | 0.1 | 1.81 | 10.1 |

TABLE 3-continued

| | Raw materials | | | Proportions of blended raw materials (molar ratio) | | | Ionic radius | Ratio of ionic radius of X to ionic radius per valence |
| | Material A | Material B | Material C | Material A | Material B | Material C | of X (Å) | of E |
|---|---|---|---|---|---|---|---|---|
| Example 47 | LiCl | ZrCl$_{3.9}$ | TbCl$_3$ | 2.1 | 0.9 | 0.1 | 1.81 | 10.1 |
| Example 48 | LiCl | ZrCl$_{3.9}$ | DyCl$_3$ | 2.1 | 0.9 | 0.1 | 1.81 | 10.1 |
| Example 49 | LiCl | ZrCl$_{3.9}$ | HoCl$_3$ | 2.1 | 0.9 | 0.1 | 1.81 | 10.1 |
| Example 50 | LiCl | ZrCl$_{3.9}$ | ErCl$_3$ | 2.1 | 0.9 | 0.1 | 1.81 | 10.1 |
| Example 51 | LiCl | ZrCl$_{3.9}$ | TmCl$_3$ | 2.1 | 0.9 | 0.1 | 1.81 | 10.1 |
| Example 52 | LiCl | ZrCl$_{3.9}$ | YbCl$_3$ | 2.1 | 0.9 | 0.1 | 1.81 | 10.1 |
| Example 53 | LiCl | ZrCl$_{3.9}$ | LuCl$_3$ | 2.1 | 0.9 | 0.1 | 1.81 | 10.1 |
| Example 54 | LiCl | ZrCl$_{3.9}$ | SnCl$_4$ | 2.0 | 0.9 | 0.1 | 1.81 | 10.1 |
| Example 55 | LiCl | ZrCl$_{3.9}$ | NbCl$_5$ | 1.9 | 0.9 | 0.1 | 1.81 | 10.1 |
| Example 56 | LiCl | ZrCl$_{3.9}$ | TaCl$_5$ | 1.9 | 0.9 | 0.1 | 1.81 | 10.1 |
| Example 57 | LiCl | ZrCl$_{3.9}$ | WCl$_6$ | 1.8 | 0.9 | 0.1 | 1.81 | 10.1 |
| Example 58 | LiCl | ZrCl$_{3.3}$ | — | 2.0 | 1.0 | — | 1.81 | 10.1 |
| Example 59 | LiCl | ZrCl$_{3.4}$ | — | 2.0 | 1.0 | — | 1.81 | 10.1 |
| Example 60 | LiCl | ZrCl$_{3.5}$ | — | 2.0 | 1.0 | — | 1.81 | 10.1 |

TABLE 4

| | Raw materials | | | Proportions of blended raw materials (molar ratio) | | | Ionic radius | Ratio of ionic radius of X to ionic radius per valence |
| | Material A | Material B | Material C | Material A | Material B | Material C | of X (Å) | of E |
|---|---|---|---|---|---|---|---|---|
| Example 61 | LiCl | ZrCl$_{3.6}$ | — | 2.0 | 1.0 | — | 1.81 | 10.1 |
| Example 62 | LiCl | ZrCl$_{3.7}$ | — | 2.0 | 1.0 | — | 1.81 | 10.1 |
| Example 63 | LiCl | ZrCl$_{3.8}$ | — | 2.0 | 1.0 | — | 1.81 | 10.1 |
| Example 64 | LiCl | ZrCl$_{3.9}$ | — | 2.0 | 1.0 | — | 1.81 | 10.1 |
| Example 65 | LiF | ZrF$_{3.9}$ | — | 2.0 | 1.0 | — | 1.33 | 7.4 |
| Example 66 | LiBr | ZrBr$_{3.9}$ | — | 2.0 | 1.0 | — | 1.96 | 10.9 |
| Example 67 | LiI | ZrI$_{3.9}$ | — | 2.0 | 1.0 | — | 2.20 | 12.2 |
| Example 68 | LiCl | LiF | ZrCl$_{3.3}$ | 1.0 | 1.0 | 1.0 | 1.73 | 9.6 |
| Example 69 | LiCl | LiF | ZrCl$_{3.4}$ | 1.0 | 1.0 | 1.0 | 1.73 | 9.6 |
| Example 70 | LiCl | LiF | ZrCl$_{3.5}$ | 1.0 | 1.0 | 1.0 | 1.73 | 9.6 |
| Example 71 | LiCl | LiF | ZrCl$_{3.6}$ | 1.0 | 1.0 | 1.0 | 1.73 | 9.6 |
| Example 72 | LiCl | LiF | ZrCl$_{3.7}$ | 1.0 | 1.0 | 1.0 | 1.73 | 9.6 |
| Example 73 | LiCl | LiF | ZrCl$_{3.8.}$ | 1.0 | 1.0 | 1.0 | 1.73 | 9.6 |
| Example 74 | LiCl | LiF | ZrCl$_{3.9}$ | 1.0 | 1.0 | 1.0 | 1.73 | 9.6 |
| Example 75 | LiCl | LiBr | ZrCl$_{3.9}$ | 1.0 | 1.0 | 1.0 | 1.84 | 10.2 |
| Example 76 | LiCl | LiI | ZrCl$_{3.9}$ | 1.0 | 1.0 | 1.0 | 1.88 | 10.4 |
| Example 77 | LiF | LiBr | ZrBr$_{3.9}$ | 1.0 | 1.0 | 1.0 | 1.86 | 10.3 |
| Example 78 | LiF | LiI | ZrI$_{3.9}$ | 1.0 | 1.0 | 1.0 | 2.06 | 11.4 |
| Example 79 | LiI | ZrBr$_{3.93}$ | ZrI$_{3.8}$ | 2.0 | 0.75 | 0.25 | 2.08 | 11.6 |
| Example 80 | LiF | LiBr | ZrCl$_{3.9}$ | 1.0 | 1.0 | 1.0 | 1.76 | 9.8 |
| Example 81 | LiF | LiI | ZrCl$_{3.9}$ | 1.0 | 1.0 | 1.0 | 1.80 | 10.0 |
| Example 82 | LiBr | LiI | ZrCl$_{3.9}$ | 1.0 | 1.0 | 1.0 | 1.90 | 10.6 |
| Example 83 | LiI | ZrF$_4$ | ZrBr$_{3.9}$ | 2.0 | 0.25 | 0.75 | 1.94 | 10.8 |
| Example 84 | LiCl | ZrCl$_{3.9}$ | — | 2.0 | 1.0 | — | 1.81 | 10.1 |
| Example 85 | LiCl | ZrCl$_{3.9}$ | — | 2.0 | 1.0 | — | 1.81 | 10.1 |
| Example 86 | LiCl | ZrCl$_{3.9}$ | — | 2.0 | 1.0 | — | 1.81 | 10.1 |
| Example 87 | LiCl | ZrCl$_{3.9}$ | — | 2.0 | 1.0 | — | 1.81 | 10.1 |
| Example 88 | LiCl | z | — | 2.0 | 1.0 | — | 1.81 | 10.1 |
| Comparative Example 1 | LiCl | ZrCl$_4$ | — | 2.0 | 1.0 | — | 1.81 | 10.1 |
| Comparative Example 2 | LiCl | ZrCl$_4$ | CsCl | 2.3 | 0.9 | 0.1 | 1.81 | 10.1 |
| Comparative Example 3 | LiCl | ZrCl$_4$ | BaCl$_2$ | 2.2 | 0.9 | 0.1 | 1.81 | 10.1 |
| Comparative Example 4 | LiCl | LiF | ZrCl$_4$ | 1.0 | 1.0 | 1.0 | 1.73 | 9.6 |
| Comparative Example 5 | LiCl | YCl$_3$ | — | 3.0 | 1.0 | — | 1.81 | 6.0 |

TABLE 5

| | A | E | G | Valence of G | X | | | a | b | α | d | Satisfaction of Formula (1) | Solid electrolyte | Ionic conductivity (mS · cm⁻¹) | Discharge capacity (mAh) |
|---|---|---|---|---|---|---|---|---|---|---|---|---|---|---|---|
| Example 1 | Li | Zr | — | — | Cl | — | — | 0.0 | 0.0 | 0.0 | 5.9 | O | $Li_2ZrCl_{5.9}$ | 1.4 | 2.4 |
| Example 2 | Li | Hf | — | — | Cl | — | — | 0.0 | 0.0 | 0.0 | 5.9 | O | $Li_2HfCl_{5.9}$ | 1.1 | 2.3 |
| Example 3 | Li | Ti | — | — | Cl | — | — | 0.0 | 0.0 | 0.0 | 5.9 | O | $Li_2TiCl_{5.9}$ | 1.0 | 2.2 |
| Example 4 | Li | Sn | — | — | Cl | — | — | 0.0 | 0.0 | 0.0 | 5.9 | O | $Li_2SnCl_{5.9}$ | 1.0 | 2.2 |
| Example 5 | Li | Zr | Cs | 1 | Cl | — | — | 0.3 | 0.1 | 0.0 | 5.3 | O | $Li_{2.3}Zr_{0.9}Cs_{0.1}Cl_{5.3}$ | 1.3 | 2.3 |
| Example 6 | Li | Zr | Cs | 1 | Cl | — | — | 0.3 | 0.1 | 0.0 | 5.4 | O | $Li_{2.3}Zr_{0.9}Cs_{0.1}Cl_{5.4}$ | 1.4 | 2.4 |
| Example 7 | Li | Zr | Cs | 1 | Cl | — | — | 0.3 | 0.1 | 0.0 | 5.5 | O | $Li_{2.3}Zr_{0.9}Cs_{0.1}Cl_{5.5}$ | 1.5 | 2.5 |
| Example 8 | Li | Zr | Cs | 1 | Cl | — | — | 0.3 | 0.1 | 0.0 | 5.6 | O | $Li_{2.3}Zr_{0.9}Cs_{0.1}Cl_{5.6}$ | 1.6 | 2.6 |
| Example 9 | Li | Zr | Cs | 1 | Cl | — | — | 0.3 | 0.1 | 0.0 | 5.7 | O | $Li_{2.3}Zr_{0.9}Cs_{0.1}Cl_{5.7}$ | 1.7 | 2.7 |
| Example 10 | Li | Zr | Cs | 1 | Cl | — | — | 0.3 | 0.1 | 0.0 | 5.8 | O | $Li_{2.3}Zr_{0.9}Cs_{0.1}Cl_{5.8}$ | 1.8 | 2.8 |
| Example 11 | Li | Zr | Cs | 1 | Cl | — | — | 0.3 | 0.1 | 0.0 | 5.9 | O | $Li_{2.3}Zr_{0.9}Cs_{0.1}Cl_{5.9}$ | 1.7 | 2.5 |
| Example 12 | Li | Zr | Cs | 1 | Cl | — | — | 0.6 | 0.2 | 0.0 | 5.9 | O | $Li_{2.6}Zr_{0.8}Cs_{0.2}Cl_{5.9}$ | 2.0 | 3.1 |
| Example 13 | Li | Zr | Cs | 1 | Cl | — | — | 0.9 | 0.3 | 0.0 | 5.9 | O | $Li_{2.9}Zr_{0.7}Cs_{0.3}Cl_{5.9}$ | 1.5 | 2.4 |
| Example 14 | Li | Zr | Ag | 1 | Cl | — | — | 0.3 | 0.1 | 0.0 | 5.9 | O | $Li_{2.3}Zr_{0.9}Ag_{0.1}Cl_{5.9}$ | 1.2 | 2.2 |
| Example 15 | Li | Zr | Au | 1 | Cl | — | — | 0.3 | 0.1 | 0.0 | 5.9 | O | $Li_{2.3}Zr_{0.9}Au_{0.1}Cl_{5.9}$ | 1.2 | 2.2 |

Header: $A_{2+a}E_{1-b+\alpha}G_bX_d$, $0 \le b \le 0.5$, $-0.3 \le \alpha \le 0.3$, $5.0 \le d \le 6.0$

TABLE 6

| | A | E | G | Valence of G | X | | | a | b | α | d | Satisfaction of Formula (1) | Solid electrolyte | Ionic conductivity (mS · cm⁻¹) | Discharge capacity (mAh) |
|---|---|---|---|---|---|---|---|---|---|---|---|---|---|---|---|
| Example 16 | Li | Zr | Cu | 2 | Cl | — | — | 0.2 | 0.1 | 0.0 | 5.9 | O | $Li_{2.2}Zr_{0.9}Cu_{0.1}Cl_{5.9}$ | 1.5 | 2.4 |
| Example 17 | Li | Zr | Pb | 2 | Cl | — | — | 0.2 | 0.1 | 0.0 | 5.9 | O | $Li_{2.2}Zr_{0.9}Pb_{0.1}Cl_{5.9}$ | 1.0 | 2.2 |
| Example 18 | Li | Zr | Sn | 2 | Cl | — | — | 0.2 | 0.1 | 0.0 | 5.9 | O | $Li_{2.2}Zr_{0.9}Sn_{0.1}Cl_{5.9}$ | 1.0 | 2.1 |
| Example 19 | Li | Zr | Mg | 2 | Cl | — | — | 0.2 | 0.1 | 0.0 | 5.9 | O | $Li_{2.2}Zr_{0.9}Mg_{0.1}Cl_{5.9}$ | 1.2 | 2.2 |
| Example 20 | Li | Zr | Ca | 2 | Cl | — | — | 0.2 | 0.1 | 0.0 | 5.9 | O | $Li_{2.2}Zr_{0.9}Ca_{0.1}Cl_{5.9}$ | 1.0 | 2.2 |
| Example 21 | Li | Zr | Sr | 2 | Cl | — | — | 0.2 | 0.1 | 0.0 | 5.9 | O | $Li_{2.2}Zr_{0.9}Sr_{0.1}Cl_{5.9}$ | 1.4 | 2.3 |
| Example 22 | Li | Zr | Ba | 2 | Cl | — | — | 0.2 | 0.1 | 0.0 | 5.3 | O | $Li_{2.2}Zr_{0.9}Ba_{0.1}Cl_{5.3}$ | 1.5 | 2.6 |
| Example 23 | Li | Zr | Ba | 2 | Cl | — | — | 0.2 | 0.1 | 0.0 | 5.4 | O | $Li_{2.2}Zr_{0.9}Ba_{0.1}Cl_{5.4}$ | 1.6 | 2.7 |
| Example 24 | Li | Zr | Ba | 2 | Cl | — | — | 0.2 | 0.1 | 0.0 | 5.5 | O | $Li_{2.2}Zr_{0.9}Ba_{0.1}Cl_{5.5}$ | 1.7 | 2.8 |
| Example 25 | Li | Zr | Ba | 2 | Cl | — | — | 0.2 | 0.1 | 0.0 | 5.6 | O | $Li_{2.2}Zr_{0.9}Ba_{0.1}Cl_{5.6}$ | 1.8 | 2.9 |
| Example 26 | Li | Zr | Ba | 2 | Cl | — | — | 0.2 | 0.1 | 0.0 | 5.7 | O | $Li_{2.2}Zr_{0.9}Ba_{0.1}Cl_{5.7}$ | 1.9 | 3.0 |
| Example 27 | Li | Zr | Ba | 2 | Cl | — | — | 0.2 | 0.1 | 0.0 | 5.8 | O | $Li_{2.2}Zr_{0.9}Ba_{0.1}Cl_{5.8}$ | 2.0 | 3.1 |
| Example 28 | Li | Zr | Ba | 2 | Cl | — | — | 0.2 | 0.1 | 0.0 | 5.9 | O | $Li_{2.2}Zr_{0.9}Ba_{0.1}Cl_{5.9}$ | 1.8 | 2.6 |
| Example 29 | Li | Zr | Bi | 3 | Cl | — | — | 0.1 | 0.1 | 0.0 | 5.9 | O | $Li_{2.1}Zr_{0.9}Bi_{0.1}Cl_{5.9}$ | 1.4 | 2.3 |

Header: $A_{2+a}E_{1-b+\alpha}G_bX_d$, $0 \le b \le 0.5$, $-0.3 \le \alpha \le 0.3$, $5.0 \le d \le 6.0$

TABLE 7

| | A | E | G | Valence of G | X | | | a | b | α | d | Satisfaction of Formula (1) | Solid electrolyte | Ionic conductivity (mS · cm⁻¹) | Discharge capacity (mAh) |
|---|---|---|---|---|---|---|---|---|---|---|---|---|---|---|---|
| Example 30 | Li | Zr | In | 3 | Cl | — | — | 0.1 | 0.1 | 0.0 | 5.9 | O | $Li_{2.1}Zr_{0.9}In_{0.1}Cl_{5.9}$ | 1.1 | 2.2 |
| Example 31 | Li | Zr | Sb | 3 | Cl | — | — | 0.1 | 0.1 | 0.0 | 5.9 | O | $Li_{2.1}Zr_{0.9}Sb_{0.1}Cl_{5.9}$ | 1.2 | 2.2 |
| Example 32 | Li | Zr | Y | 3 | Cl | — | — | 0.1 | 0.1 | 0.0 | 5.9 | O | $Li_{2.1}Zr_{0.9}Y_{0.1}Cl_{5.9}$ | 1.4 | 2.3 |
| Example 33 | Li | Zr | Y | 3 | Cl | — | — | 0.2 | 0.2 | 0.0 | 5.9 | O | $Li_{2.2}Zr_{0.8}Y_{0.2}Cl_{5.9}$ | 1.3 | 2.3 |
| Example 34 | Li | Zr | Y | 3 | Cl | — | — | 0.3 | 0.3 | 0.0 | 5.9 | O | $Li_{2.3}Zr_{0.7}Y_{0.3}Cl_{5.9}$ | 1.2 | 2.2 |
| Example 35 | Li | Zr | Y | 3 | Cl | — | — | 0.4 | 0.4 | 0.0 | 5.9 | O | $Li_{2.4}Zr_{0.6}Y_{0.4}Cl_{5.9}$ | 1.1 | 2.1 |
| Example 36 | Li | Zr | Y | 3 | Cl | — | — | 0.5 | 0.5 | 0.0 | 5.9 | O | $Li_{2.5}Zr_{0.5}Y_{0.5}Cl_{5.9}$ | 1.0 | 2.1 |
| Example 37 | Li | Zr | Sc | 3 | Cl | — | — | 0.1 | 0.1 | 0.0 | 5.9 | O | $Li_{2.1}Zr_{0.9}Sc_{0.1}Cl_{5.9}$ | 1.0 | 2.0 |
| Example 38 | Li | Zr | Al | 3 | Cl | — | — | 0.1 | 0.1 | 0.0 | 5.9 | O | $Li_{2.1}Zr_{0.9}Al_{0.1}Cl_{5.9}$ | 1.0 | 2.1 |
| Example 39 | Li | Zr | La | 3 | Cl | — | — | 0.1 | 0.1 | 0.0 | 5.9 | O | $Li_{2.1}Zr_{0.9}La_{0.1}Cl_{5.9}$ | 1.2 | 2.2 |
| Example 40 | Li | Zr | Ce | 3 | Cl | — | — | 0.1 | 0.1 | 0.0 | 5.9 | O | $Li_{2.1}Zr_{0.9}Ce_{0.1}Cl_{5.9}$ | 1.2 | 2.2 |
| Example 41 | Li | Zr | Pr | 3 | Cl | — | — | 0.1 | 0.1 | 0.0 | 5.9 | O | $Li_{2.1}Zr_{0.9}Pr_{0.1}Cl_{5.9}$ | 1.0 | 2.1 |
| Example 42 | Li | Zr | Nd | 3 | Cl | — | — | 0.1 | 0.1 | 0.0 | 5.9 | O | $Li_{2.1}Zr_{0.9}Nd_{0.1}Cl_{5.9}$ | 1.2 | 2.2 |
| Example 43 | Li | Zr | Pm | 3 | Cl | — | — | 0.1 | 0.1 | 0.0 | 5.9 | O | $Li_{2.1}Zr_{0.9}Pm_{0.1}Cl_{5.9}$ | 1.0 | 2.1 |
| Example 44 | Li | Zr | Sm | 3 | Cl | — | — | 0.1 | 0.1 | 0.0 | 5.9 | O | $Li_{2.1}Zr_{0.9}Sm_{0.1}Cl_{5.9}$ | 1.2 | 2.2 |

Header: $A_{2+a}E_{1-b+\alpha}G_bX_d$, $0 \le b \le 0.5$, $-0.3 \le \alpha \le 0.3$, $5.0 \le d \le 6.0$

TABLE 8

| | A | E | G | Valence of G | X | | | a | b | α | d | Satisfaction of Formula (1) | Solid electrolyte | Ionic conductivity (mS · cm$^{-1}$) | Discharge capacity (mAh) |
|---|---|---|---|---|---|---|---|---|---|---|---|---|---|---|---|
| | | | | $A_{2+a}E_{1-b+\alpha}G_bX_d$ $0 \le b \le 0.5$, $-0.3 \le \alpha \le 0.3$, $5.0 \le d \le 6.0$ | | | | | | | | | | | |
| Example 45 | Li | Zr | Eu | 3 | Cl | — | — | 0.1 | 0.1 | 0.0 | 5.9 | O | $Li_{2.1}Zr_{0.9}Eu_{0.1}Cl_{5.9}$ | 1.0 | 2.0 |
| Example 46 | Li | Zr | Gd | 3 | Cl | — | — | 0.1 | 0.1 | 0.0 | 5.9 | O | $Li_{2.1}Zr_{0.9}Gd_{0.1}Cl_{5.9}$ | 1.0 | 2.0 |
| Example 47 | Li | Zr | Tb | 3 | Cl | — | — | 0.1 | 0.1 | 0.0 | 5.9 | O | $Li_{2.1}Zr_{0.9}Tb_{0.1}Cl_{5.9}$ | 1.0 | 2.0 |
| Example 48 | Li | Zr | Dy | 3 | Cl | — | — | 0.1 | 0.1 | 0.0 | 5.9 | O | $Li_{2.1}Zr_{0.9}Dy_{0.1}Cl_{5.9}$ | 1.1 | 2.1 |
| Example 49 | Li | Zr | Ho | 3 | Cl | — | — | 0.1 | 0.1 | 0.0 | 5.9 | O | $Li_{2.1}Zr_{0.9}Ho_{0.1}Cl_{5.9}$ | 1.2 | 2.3 |
| Example 50 | Li | Zr | Er | 3 | Cl | — | — | 0.1 | 0.1 | 0.0 | 5.9 | O | $Li_{2.1}Zr_{0.9}Er_{0.1}Cl_{5.9}$ | 1.0 | 2.0 |
| Example 51 | Li | Zr | Tm | 3 | Cl | — | — | 0.1 | 0.1 | 0.0 | 5.9 | O | $Li_{2.1}Zr_{0.9}Tm_{0.1}Cl_{5.9}$ | 1.0 | 2.0 |
| Example 52 | Li | Zr | Yb | 3 | Cl | — | — | 0.1 | 0.1 | 0.0 | 5.9 | O | $Li_{2.1}Zr_{0.9}Yb_{0.1}Cl_{5.9}$ | 1.4 | 2.3 |
| Example 53 | Li | Zr | Lu | 3 | Cl | — | — | 0.1 | 0.1 | 0.0 | 5.9 | O | $Li_{2.1}Zr_{0.9}Lu_{0.1}Cl_{5.9}$ | 1.4 | 2.3 |
| Example 54 | Li | Zr | Sn | 4 | Cl | — | — | 0.0 | 0.1 | 0.0 | 5.9 | O | $Li_2Zr_{0.9}Sn_{0.1}Cl_{5.9}$ | 1.4 | 2.3 |
| Example 55 | Li | Zr | Nb | 5 | Cl | — | — | -0.1 | 0.1 | 0.0 | 5.9 | O | $Li_{1.9}Zr_{0.9}Nb_{0.1}Cl_{5.9}$ | 1.5 | 2.4 |
| Example 56 | Li | Zr | Ta | 5 | Cl | — | — | -0.1 | 0.1 | 0.0 | 5.9 | O | $Li_{1.9}Zr_{0.9}Ta_{0.1}Cl_{5.9}$ | 1.4 | 2.3 |
| Example 57 | Li | Zr | W | 6 | Cl | — | — | -0.2 | 0.1 | 0.0 | 5.9 | O | $Li_{1.8}Zr_{0.9}W_{0.1}Cl_{5.9}$ | 1.4 | 2.4 |
| Example 58 | Li | Zr | — | — | Cl | — | — | 0.0 | 0.0 | 0.0 | 5.3 | O | $Li_2ZrCl_{5.3}$ | 1.1 | 2.1 |
| Example 59 | Li | Zr | — | — | Cl | — | — | 0.0 | 0.0 | 0.0 | 5.4 | O | $Li_2ZrCl_{5.4}$ | 1.2 | 2.2 |
| Example 60 | Li | Zr | — | — | Cl | — | — | 0.0 | 0.0 | 0.0 | 5.5 | O | $Li_2ZrCl_{5.5}$ | 1.3 | 2.3 |

TABLE 9

| | A | E | G | Valence of G | X | | | a | b | α | d | Satisfaction of Formula (1) | Solid electrolyte | Ionic conductivity (mS · cm$^{-1}$) | Discharge capacity (mAh) |
|---|---|---|---|---|---|---|---|---|---|---|---|---|---|---|---|
| | | | | $A_{2+a}E_{1-b+\alpha}G_bX_d$ $0 \le b \le 0.5$, $-0.3 \le \alpha \le 0.3$, $5.0 \le d \le 6.0$ | | | | | | | | | | | |
| Example 61 | Li | Zr | — | — | Cl | — | — | 0.0 | 0.0 | 0.0 | 5.6 | O | $Li_2ZrCl_{5.6}$ | 1.4 | 2.4 |
| Example 62 | Li | Zr | — | — | Cl | — | — | 0.0 | 0.0 | 0.0 | 5.7 | O | $Li_2ZrCl_{5.7}$ | 1.5 | 2.5 |
| Example 63 | Li | Zr | — | — | Cl | — | — | 0.0 | 0.0 | 0.0 | 5.8 | O | $Li_2ZrCl_{5.8}$ | 1.6 | 2.6 |
| Example 64 | Li | Zr | — | — | Cl | — | — | 0.0 | 0.0 | 0.0 | 5.9 | O | $Li_2ZrCl_{5.9}$ | 1.4 | 2.3 |
| Example 65 | Li | Zr | — | — | F | — | — | 0.0 | 0.0 | 0.0 | 5.9 | O | $Li_2ZrF_{5.9}$ | 1.0 | 1.9 |
| Example 66 | Li | Zr | — | — | Br | — | — | 0.0 | 0.0 | 0.0 | 5.9 | O | $Li_2ZrBr_{5.9}$ | 2.0 | 3.1 |
| Example 67 | Li | Zr | — | — | I | — | — | 0.0 | 0.0 | 0.0 | 5.9 | O | $Li_2ZrI_{5.9}$ | 2.6 | 3.6 |
| Example 68 | Li | Zr | — | — | Cl | F | — | 0.0 | 0.0 | 0.0 | 5.3 | O | $Li_2ZrCl_{4.3}F$ | 1.0 | 2.0 |
| Example 69 | Li | Zr | — | — | Cl | F | — | 0.0 | 0.0 | 0.0 | 5.4 | O | $Li_2ZrCl_{4.4}F$ | 1.1 | 2.1 |
| Example 70 | Li | Zr | — | — | Cl | F | — | 0.0 | 0.0 | 0.0 | 5.5 | O | $Li_2ZrCl_{4.5}F$ | 1.3 | 2.3 |
| Example 71 | Li | Zr | — | — | Cl | F | — | 0.0 | 0.0 | 0.0 | 5.6 | O | $Li_2ZrCl_{4.6}F$ | 1.4 | 2.4 |
| Example 72 | Li | Zr | — | — | Cl | F | — | 0.0 | 0.0 | 0.0 | 5.7 | O | $Li_2ZrCl_{4.7}F$ | 1.5 | 2.5 |
| Example 73 | Li | Zr | — | — | Cl | F | — | 0.0 | 0.0 | 0.0 | 5.8 | O | $Li_2ZrCl_{4.8}F$ | 1.6 | 2.6 |
| Example 74 | Li | Zr | — | — | Cl | F | — | 0.0 | 0.0 | 0.0 | 5.9 | O | $Li_2ZrCl_{4.9}F$ | 1.4 | 2.2 |
| Example 75 | Li | Zr | — | — | Cl | Br | — | 0.0 | 0.0 | 0.0 | 5.9 | O | $Li_2ZrCl_{4.9}Br$ | 1.5 | 2.5 |
| Example 76 | Li | Zr | — | — | Cl | I | — | 0.0 | 0.0 | 0.0 | 5.9 | O | $Li_2ZrCl_{4.9}I$ | 1.7 | 2.6 |
| Example 77 | Li | Zr | — | — | F | Br | — | 0.0 | 0.0 | 0.0 | 5.9 | O | $Li_2ZrFBr_{4.9}$ | 1.6 | 2.6 |
| Example 78 | Li | Zr | — | — | F | I | — | 0.0 | 0.0 | 0.0 | 5.9 | O | $Li_2ZrFI_{4.9}$ | 2.4 | 3.5 |
| Example 79 | Li | Zr | — | — | Br | I | — | 0.0 | 0.0 | 0.0 | 5.9 | O | $Li_2ZrBr_{2.95}I_{2.95}$ | 2.5 | 3.6 |
| Example 80 | Li | Zr | — | — | Cl | F | Br | 0.0 | 0.0 | 0.0 | 5.9 | O | $Li_2ZrCl_{3.9}FBr$ | 1.3 | 2.2 |

TABLE 10

| | A | E | G | Valence of G | X | | | a | b | α | d | Satisfaction of Formula (1) | Solid electrolyte | Ionic conductivity (mS · cm$^{-1}$) | Discharge capacity (mAh) |
|---|---|---|---|---|---|---|---|---|---|---|---|---|---|---|---|
| | | | | $A_{2+a}E_{1-b+\alpha}G_bX_d$ $0 \le b \le 0.5$, $-0.3 \le \alpha \le 0.3$, $5.0 \le d \le 6.0$ | | | | | | | | | | | |
| Example 81 | Li | Zr | — | — | Cl | F | I | 0.0 | 0.0 | 0.0 | 5.9 | O | $Li_2ZrCl_{3.9}FI$ | 1.4 | 2.3 |
| Example 82 | Li | Zr | — | — | Cl | Br | I | 0.0 | 0.0 | 0.0 | 5.9 | O | $Li_2ZrCl_{3.9}BrI$ | 1.8 | 2.7 |
| Example 83 | Li | Zr | — | — | F | Br | I | 0.0 | 0.0 | 0.0 | 5.95 | O | $Li_2ZrFBr_{2.95}I_2$ | 1.9 | 2.9 |
| Example 84 | Li | Zr | — | — | Cl | — | — | 0.0 | 0.0 | 0.0 | 5.9 | O | $Li_2ZrCl_{5.9} + Li_2O$ | 1.5 | 2.6 |
| Example 85 | Li | Zr | — | — | Cl | — | — | 0.0 | 0.0 | 0.0 | 5.9 | O | $Li_2ZrCl_{5.9} + LiCl$ | 1.5 | 2.5 |
| Example 86 | Li | Zr | — | — | Cl | — | — | 0.0 | 0.0 | 0.0 | 5.9 | O | $Li_2ZrCl_{5.9} + ZrO_2$ | 1.6 | 2.7 |
| Example 87 | Li | Zr | — | — | Cl | — | — | 0.0 | 0.0 | 0.0 | 5.9 | O | $Li_2ZrCl_{5.9} + ZrCl_4$ | 1.5 | 2.6 |
| Example 88 | Li | Zr | — | — | Cl | — | — | 0.0 | 0.0 | 0.0 | 5.9 | O | $Li_2ZrCl_{5.9} + CaO$ | 1.7 | 2.8 |
| Comparative Example 1 | Li | Zr | — | — | Cl | — | — | 0.0 | 0.0 | 0.0 | 6.0 | — | $Li_2ZrCl_{6.0}$ | 0.6 | 1.2 |

TABLE 10-continued

| $A_{2+a}E_{1-b+a}G_bX_d$ $0 \le b \le 0.5, -0.3 \le a \le 0.3, 5.0 \le d \le 6.0$ | | | | | | | | | | | Satisfaction of Formula (1) | Solid electrolyte | Ionic conductivity (mS·cm⁻¹) | Discharge capacity (mAh) |
|---|---|---|---|---|---|---|---|---|---|---|---|---|---|---|
| A | E | G | Valence of G | X | | | a | b | α | d | | | | |
| Comparative Example 2 | Li | Zr | — | — | Cl | — | — | 0.3 | 0.1 | 0.0 | 6.0 | — | $Li_{2.3}Zr_{0.9}Cs_{0.1}Cl_{6.0}$ | 0.5 | 1.3 |
| Comparative Example 3 | Li | Zr | Cs | 1 | Cl | — | — | 0.2 | 0.1 | 0.0 | 6.0 | — | $Li_{2.2}Zr_{0.9}Ba_{0.1}Cl_{6.0}$ | 0.6 | 1.4 |
| Comparative Example 4 | Li | Zr | Ba | 2 | Cl | F | — | 0.0 | 0.0 | 0.0 | 6.0 | — | $Li_2ZrCl_{5.0}F$ | 0.4 | 1.0 |
| Comparative Example 5 | Li | Y | — | — | Cl | — | — | 0.0 | 0.0 | 0.0 | 6.0 | — | $Li_3YCl_{6.0}$ | 0.4 | 1.1 |

(Measurement of Ion Conductivities)

Each of the solid electrolytes of Example 1 to Example 88 and Comparative Example 1 to Comparative Example 5 was loaded into a pressure-forming die, and subjected to pressure-forming at a pressure of 373 MPa; and thereby, test bodies were obtained.

In more detail, resin holders having a diameter of 10 mm, upper punches and lower punches each having a diameter of 9.99 mm were prepared. The material of the upper and lower punches was die steel (SKD material). The lower punch was inserted into the resin holder, and each of the solid electrolytes of Example 1 to Example 88 and Comparative Example 1 to Comparative Example 5 (110 mg) was injected thereinto from above. The upper punch was inserted on the solid electrolyte. The resin holder with the upper and lower punches inserted thereinto will be referred to as the set. The set was placed in a pressing machine, and the solid electrolyte was formed at a pressure of 373 MPa. This set was taken out from the pressing machine.

Two stainless steel discs and two TEFLON (registered trademark) discs each having a diameter of 50 mm and a thickness of 5 mm were prepared, respectively. There were four screw holes in each of the stainless steel discs and the TEFLON (registered trademark) discs. The stainless steel discs and the TEFLON (registered trademark) discs were placed on and under the set, and the set was pressurized by threading screws through the four screw holes and tightening the screws.

Specifically, a laminate of the stainless steel disc, the TEFLON (registered trademark) disc, the set, the TEFLON (registered trademark) disc and the stainless steel disc in this order was swaged with screws; and thereby, a jig for ionic conductivity measurement was produced. There were screw holes, into which screws were threaded, on the side surfaces of the upper and lower punches. Screws were threaded into the upper and lower punches and used as terminals for ionic conductivity measurement.

After that, the ionic conductivity of each test body accommodated in the set in the jig for ionic conductivity measurement was measured. The ionic conductivity was measured using a potentiostat equipped with a frequency response analyzer by an electrochemical impedance measurement method. The ionic conductivity was measured in a frequency range of 7 MHz to 0.1 Hz under conditions where an amplitude was 10 mV and a temperature was 30° C. The results are shown in Table 5 to Table 10.

[Production of Solid Electrolyte Batteries]

Solid electrolyte batteries including a solid electrolyte layer composed of each of the solid electrolytes of Example 1 to Example 88 and Comparative Example 1 to Comparative Example 5 were produced by a method to be described below, respectively. The solid electrolyte batteries were produced in a glove box in which an argon atmosphere having a dew point of −70° C. or lower was prepared. In addition, charge and discharge tests were carried out by a method to be described below, and discharge capacities were measured.

First, lithium cobalt oxide ($LiCoO_2$), each of the solid electrolytes of Example 1 to Example 88 and Comparative Example 1 to Comparative Example 5 and carbon black were weighed in proportions of 81:16:3 (parts by weight) and mixed in an agate mortar; and thereby, a positive electrode mixture was prepared. Next, graphite, each of the solid electrolytes of Example 1 to Example 88 and Comparative Example 1 to Comparative Example 5 and carbon black were weighed in proportions of 67:30:3 (parts by weight) and mixed in an agate mortar; and thereby, a negative electrode mixture was prepared.

The lower punch was inserted into the resin holder, and each of the solid electrolytes of Example 1 to Example 88 and Comparative Example 1 to Comparative Example 5 (110 mg) was injected thereinto from above the resin holder. The upper punch was inserted on the solid electrolyte. The set was placed in a pressing machine, and the solid electrolyte was formed at a pressure of 373 MPa. The set was taken out from the pressing machine, and the upper punch was removed.

Each of the positive electrode mixtures (39 mg) was injected on the (pellet-shaped) solid electrolyte in the resin holder, the upper punch was inserted on the positive electrode mixture, and the set was placed in the pressing machine and formed at a pressure of 373 MPa. Next, the set was taken out and flipped over, and the lower punch was removed. Each of the negative electrode mixtures (20 mg) was injected on the solid electrolyte (pellet), the lower punch was inserted on the negative electrode mixture, the set was placed in the pressing machine and formed at a pressure of 373 MPa.

As described above, battery elements composed of the positive electrode, the solid electrolyte and the negative electrode were produced in the resin holder. Screws were threaded into the screw holes on the side surfaces of the upper and lower punches as terminals for charge and discharge.

As an exterior body that was to seal the battery elements, an aluminum laminate material was prepared. This was a laminate material composed of PET (12), Al (40) and PP (50) in this order. PET stands for polyethylene terephthalate, and PP stands for polypropylene. The numerical values in the parenthesis indicate the thickness (the unit is μm) of each layer. This aluminum laminate material was cut into the A4 size and folded at the center of the long side such that PP became the inner surface.

As positive electrode terminals, aluminum foils (width: 4 mm, length: 40 mm and thickness: 100 μm) were prepared. In addition, as negative electrode terminals, nickel foils (width: 4 mm, length: 40 mm and thickness: 100 μm) were prepared. Acid-modified PP was wound around each of these external terminals (the positive electrode terminals and the negative electrode terminals), and the external terminals were thermally attached to the exterior bodies. This was intended to improve the sealing property between the external terminal and the exterior body.

The positive electrode terminal and the negative electrode terminal were placed at approximately the centers of the two facing sides of the folded aluminum laminate material so as to be sandwiched by the aluminum laminate material and were heat-sealed. After that, the set was inserted into the exterior body, and the screw on the side surface of the upper punch and the positive electrode terminal in the exterior body were connected with a lead line to electrically connect the positive electrode and the positive electrode terminal. In addition, the screw on the side surface of the lower punch and the negative electrode terminal in the exterior body were connected with a lead line to electrically connect the negative electrode and the negative electrode terminal. After that, an opening part of the exterior body was heat-sealed to produce a solid electrolyte battery.

The charge and discharge tests were carried out in a constant-temperature chamber (25° C.). As the notation of the charge and discharge current, hereinafter, C rate notations will be used. $nC$ (mA) indicates a current capable of charging and discharging the nominal capacity (mAh) for $1/n$ (h). For example, in the case of a battery having a nominal capacity of 70 mAh, a current of 0.05C is 3.5 mA (calculation formula: $70 \times 0.05 = 3.5$). Similarly, a current of 0.2C is 14 mA, and a current of 2C is 140 mA. The solid electrolyte batteries were charged up to 4.2 V at 0.2C by constant current/constant voltage (referred to as CCCV). The charging was ended when the current became $1/20$C. As the discharging, the solid electrolyte batteries were discharged to 3.0 V at 0.2C. The results are shown in Table 5 to Table 10.

As shown in Table 5 to Table 10, the solid electrolytes of Example 1 to Example 88 all had a sufficiently high ionic conductivity compared with the solid electrolytes of Comparative Example 1 to Comparative Example 5. In addition, all the solid electrolyte batteries having a solid electrolyte layer composed of the solid electrolytes of Example 1 to Example 88 respectively had a sufficiently large discharge capacity compared with the solid electrolytes of Comparative Example 1 to Comparative Example 5.

EXPLANATION OF REFERENCE SIGNS

1 Positive electrode
1A Positive electrode current collector
1B Positive electrode mixture layer
2 Negative electrode
2A Negative electrode current collector
2B Negative electrode mixture layer
3 Solid electrolyte layer
10 Solid electrolyte battery

What is claimed is:

1. A solid electrolyte comprising a compound represented by the following formula (1), $$A_{2+a}E_{1-b+a}G_bX_d \tag{1}$$

where:
A is one element selected from the group consisting of Li, K and Na,
E is at least one element selected from the group consisting of Zr, Hf, Ti and Sn,
X is Cl
a is zero in a case where G is not contained,
b is zero,
$-0.3 \leq \alpha \leq 0.3$, and
$5.7 \leq d \leq 5.8$.

2. The solid electrolyte according to claim 1, wherein, in the compound represented by the formula (1), A is Li, E is Zr, and X is Cl.

3. The solid electrolyte according to claim 1, wherein the compound represented by the formula (1) is a compound represented by the following formula (2), $$Li_2ZrCl_{d-e}I_e \tag{2}$$

where:
$5.7 \leq d \leq 5.8$, and
e is zero.

4. The solid electrolyte according to claim 1, further comprising:
0.05 to 1.0 mass % of at least one compound selected from the group consisting of:
$A_2O$, where A is one element selected from the group consisting of Li, K and Na;
AX, where A is one element selected from the group consisting of Li, K and Na, and X is at least one selected from the group consisting of F, Cl, Br and I;
$EO_2$, where E is at least one element selected from the group consisting of Zr, Hf, Ti and Sn;
$EX_4$, where E is at least one element selected from the group consisting of Zr, Hf, Ti and Sn, and X is at least one selected from the group consisting of F, Cl, Br and I; and
$GO_n$, where:
G is at least one element selected from the group consisting of Mg, Ca, Sr, Cs, Ba, Al, Sc, La, Ce, Pr, Nd, Pm, Sm, Eu, Gd, Tb, Dy, Ho, Er, Tm, Yb, Lu, Cu, Ag, Au, Pb, Bi, In, Sn, Sb, Nb, Ta and W, and
n is:
0.5 in a case where G is a monovalent element,
1 in a case where G is a divalent element,
1.5 in a case where G is a trivalent element,
2 in a case where G is a tetravalent element,
2.5 in a case where G is a pentavalent element, and
3 in a case where G is a hexavalent element.

5. A solid electrolyte layer comprising:
the solid electrolyte according to claim 1.

6. A solid electrolyte battery comprising:
a solid electrolyte layer;
a positive electrode; and
a negative electrode,
wherein at least one of the solid electrolyte layer, the positive electrode and the negative electrode contains the solid electrolyte according to claim 1.

7. A solid electrolyte battery comprising:
a solid electrolyte layer;
a positive electrode; and
a negative electrode,
wherein the solid electrolyte layer contains the solid electrolyte according to claim 1.

8. A solid electrolyte comprising a compound represented by the following formula (1), $$A_{2+a}E_{1-b+a}G_bX_d \tag{1}$$

where:

A is one element selected from the group consisting of Li, K and Na,

E is at least one element selected from the group consisting of Zr, Hf, Ti and Sn, G is Nb, X is at least one selected from the group consisting of F, Cl, Br and I, a is-b in a case where G is a pentavalent element, and $0 \leq b \leq 0.5$, $-0.3 \leq \alpha \leq 0.3$, and $5.0 < d < 6.0$.

\* \* \* \* \*